US008861984B2

United States Patent
Painchaud

(10) Patent No.: US 8,861,984 B2
(45) Date of Patent: Oct. 14, 2014

(54) COMPACT POLARIZATION-INSENSITIVE OPTICAL RECEIVER

(71) Applicant: Teraxion, Inc., Québec (CA)

(72) Inventor: Yves Painchaud, Québec (CA)

(73) Assignee: Teraxion Inc., Quebec (CA)

( * ) Notice: Subject to any disclaimer, the term of this patent is extended or adjusted under 35 U.S.C. 154(b) by 139 days.

(21) Appl. No.: 13/745,529

(22) Filed: Jan. 18, 2013

(65) Prior Publication Data
US 2013/0188971 A1 Jul. 25, 2013

Related U.S. Application Data

(60) Provisional application No. 61/588,411, filed on Jan. 19, 2012.

(51) Int. Cl.
| | |
|---|---|
| *H04B 10/06* | (2006.01) |
| *H04B 10/67* | (2013.01) |
| *H04B 10/61* | (2013.01) |
| *G02B 6/34* | (2006.01) |
| *G02B 6/26* | (2006.01) |
| *G02B 6/12* | (2006.01) |
| *H04B 10/00* | (2013.01) |

(52) U.S. Cl.
CPC ............ *H04B 10/612* (2013.01); *H04B 10/677* (2013.01); *G02B 6/34* (2013.01); *G02B 6/26* (2013.01); *G02B 6/12* (2013.01)
USPC ............................ 398/214; 398/202; 398/212

(58) Field of Classification Search
CPC ...... H04B 10/67; H04B 10/66; H04B 10/676; H04B 10/677
USPC .......................................... 398/202, 212, 214
See application file for complete search history.

(56) References Cited

U.S. PATENT DOCUMENTS

| | | | | |
|---|---|---|---|---|
| 5,701,372 A | * | 12/1997 | Magel et al. | 385/24 |
| 2002/0191251 A1 | * | 12/2002 | Ferguson et al. | 359/139 |
| 2006/0056845 A1 | * | 3/2006 | Parsons et al. | 398/41 |
| 2008/0069560 A1 | * | 3/2008 | Tissot et al. | 398/25 |

OTHER PUBLICATIONS

Faralli, S. et al., 25 Gbaud DQPSK Receiver Integrated on the Hybrid Silicon Platform, Group V Photonics, 8th EEE International Conference, Sep. 2011, p. 326-328.*

(Continued)

*Primary Examiner* — Daniel Dobson
(74) *Attorney, Agent, or Firm* — Marshall, Gerstein & Borun LLP

(57) ABSTRACT

A polarization-insensitive optical receiver for demodulating a phase-modulated input optical signal is provided. The optical receiver includes successively a polarization splitter, a first and second interferometric modules including respective delay lines, and a plurality of detectors. The input optical signal is split into two substantially orthogonally-polarized components, which are launched along respective optical paths into the corresponding interferometric modules where they demodulated and subsequently recombined prior to being detected by the plurality of detectors. Advantageously, the optical receiver allows mitigating undesired discrepancies between the optical paths traveled by the two polarization components by arranging the respective delay lines of the interferometric modules into intertwined spiraling structures. A waveguide assembly including a substrate and a pair of waveguides on the substrate and defining intertwined spiraling structures is also provided, as well as a waveguide coupling assembly for coupling, onto a same detector, two optical signals travelling along two parallel coplanar waveguides.

27 Claims, 14 Drawing Sheets

(56) References Cited

OTHER PUBLICATIONS

Bogaerts, W. et al., A polarization-diversity wavelength duplexer circuit in silicon-on-insulator photonic wires, Optics Express, Feb. 19, 2007, p. 1567-1578, vol. 15, No. 4.

Bogaerts, W. et al., Low-loss, low-cross-talk crossings for silicon-on-insulator nanophotonic waveguides, Optics Letters, Oct. 1, 2007, p. 2801-2803, Vo. 32, No. 19.

Doerr, C.R. et al., Monolithic PDM-DQPSK receiver in silicon, Optical Communication, 36th European Conference and Exhibition, Sep. 2010, p. 1-3.

Faralli, S. et al., 25 Gbaud DQPSK Receiver Integrated on the Hybrid Silicon Platform, Group IV Photonics, 8th IEEE International Conference, Sep. 2011, p. 326-328.

Kroh, M. et al., Hybrid Integrated 40 Gb/s DPSK Receiver on SOI, Optical Fiber Communication, Mar. 2009, p. 1-3.

Taillaert, D. et al., A Compact Two-Dimensional Grating Coupler Used as a Polarization Splitter, IEEE Photonics Technology Letters, Sep. 2003, p. 1249-1251, vol. 15, No. 9.

Vermeulen, D. et al., High-efficiency Silicon-on-Insulator Fiber-to-Chip Grating Couplers Using a Silicon Overlay, Ghent University & Interuniversity Microelectronics Center, Belgium.

Vivien, L. et al., 42 GHz p.i.n. Germanium photodetector integrated in a silicon-on-insulator waveguide, Optics Express, Apr. 13, 2009, p. 6252-6257, vol. 17, No. 8.

Voigt, K. et al., SOI based 2×2 and 4×4 waveguide couplers—Evolution from DPSK to DQPSK, 978-1-4244-1768-1, 2008, p. 209-211.

Watts, M.R. et al., Integrated mode-evolution-based polarization rotators, Optics Letters, Jan. 15, 2005, p. 138-140, vol. 30, No. 2.

Watts, M.R. et al., Integrated mode-evolution-based polarization splitter, Optics Letters, May 1, 2005, p. 967-969, vol. 30, No. 9.

Zimmerman, L. et al., Towards Silicon on Insulator DQPSK Demodulators, Optical Fiber Communication, National Fiber Optic Engineers Conference, Mar. 2010, p. 1-3.

\* cited by examiner

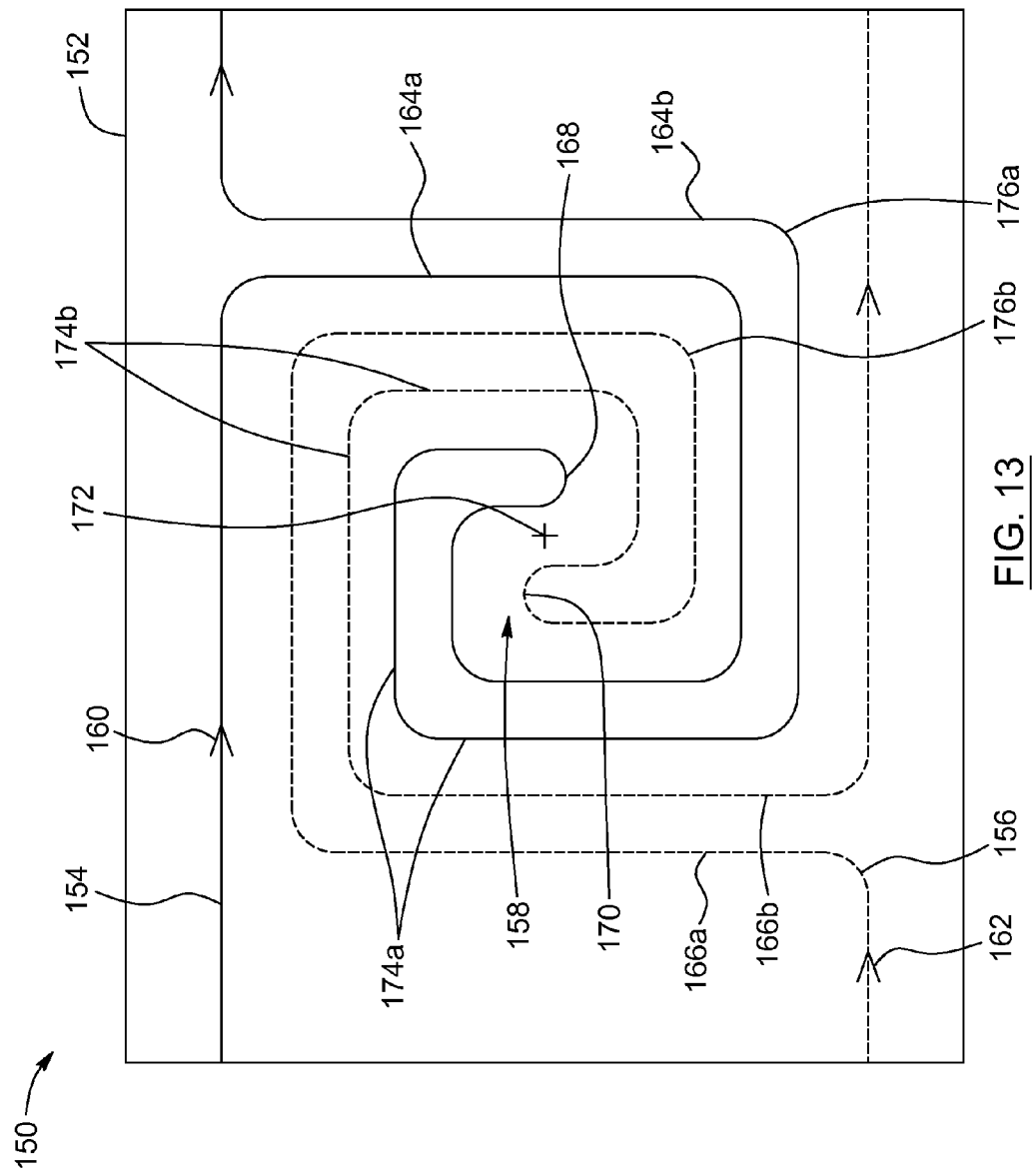

COMPACT POLARIZATION-INSENSITIVE OPTICAL RECEIVER

RELATED PATENT APPLICATION

This application incorporates by reference and claims priority to U.S. provisional patent application Ser. No. 61/588,411, filed Jan. 19, 2012.

FIELD OF THE INVENTION

The present invention relates to the field of optical components and more particularly concerns improvements useful for optical receivers for telecommunication systems, and the like.

BACKGROUND

As telecommunication systems have evolved from 10-gigabit-per-second (Gb/s) data transfer rates to 40 Gb/s and now toward 100 Gb/s, it has been desirable to develop more sophisticated modulation schemes. As a result, over the past decades, modulation of optical signals has gradually changed from simple amplitude on-off keying to more advanced modulation formats, such as phase modulation. At transmission rates of 40 Gb/s and higher, phase modulation schemes such as differential phase-shift keying (DPSK) and differential quadrature phase-shift keying (DQPSK) are now typically used. Such advanced modulation formats require an optical phase demodulation device relying on interference between neighboring bits before light detection, also known as a delay line interferometer (DLI). Examples of typical configurations for the optical demodulator suitable for DPSK and DQPSK modulation formats are illustrated in FIG. 1 (PRIOR ART) and FIG. 2 (PRIOR ART), respectively. Alternatively, a 90-degree optical hybrid mixer, such as a 2×4 multimode interference (MMI) coupler, can be used in order to simplify the DQPSK demodulator, as shown in FIG. 3 (PRIOR ART) [see, e.g., K. Voigt et al., "SOI based 2×2 and 4×4 waveguide couplers—Evolution from DPSK to DQPSK", IEEE International Conference on Group IV Photonics (GFP), paper ThBS (2008)].

While discrete components were initially used to build DPSK and DQPSK optical receivers, an interest currently exists in providing integrated solutions. Indeed, as data transfer rates rise toward 100 Gb/s, coherent communication involving polarization multiplexing further adds to the complexity at the transmitter and receiver sides. In particular, a need arises for accurately controlling the optical paths between the optical demodulation device and the detection assembly.

For at least this reason, it is now admitted that advanced modulation formats in general, and DPSK and DQPSK in particular, call for photonic integration. Over the past decade, integrated photonics has made much progress in implementing optical and electro-optical devices for use in various technological applications in fields such as optical telecommunications and signal processing. Integrated photonics relies on optical waveguides to implement devices such as optical couplers, transmitters and receivers, wavelength multiplexers and demultiplexers, and polarization splitters and rotators. In addition to improve functionality, integrated solutions are typically more cost effective and more compact. Component size is generally an important parameter in telecommunication systems, so that the introduction of new components is typically followed by an effort toward both cost and size reduction.

Among existing integrated photonic technologies, submicron silicon-on-insulator (SOI) technology provides the advantage of maximized compactness, which is made possible by the high refractive index contrast between the silicon core and silica cladding of the SOI waveguides. This enables propagation of highly confined optical modes and allows scaling integrated photonic devices down to submicron level. For example, SOI waveguides allow designing circuits with radius of curvature as small as 3 microns, which is about two orders of magnitude smaller than what can be achieved with other integration technologies. Moreover, silicon-based integrated photonics is compatible with silicon electronics and standard complementary metal-oxide-semiconductor (CMOS) fabrication methods. However, submicron SOI circuits generally support the propagation of only one polarization mode, typically a transverse electric (TE) mode, thereby complicating the realization of polarization-insensitive devices, which is highly desirable for telecommunication receivers. Single-polarization optical receivers based on submicron SOI circuits have been reported [see, e.g., S. Faralli et al., "25 Gbaud DQPSK Receiver Integrated on the Hybrid Silicon Platform", IEEE International Conference on Group IV Photonics (GFP), paper FA4 (2011)], but their commercial interest is limited.

A polarization diversity scheme, in which two orthogonal polarizations coming out of an input port are routed along different paths, has been proposed for a proper management of the polarization [W. Bogaerts et al., "A polarization-diversity wavelength duplexer circuit in silicon-on-insulator photonic wires", Opt. Expr. vol. 15 no. 4, p. 1567 (2007)]. The two polarizations may be separated using a polarization beam splitter such as a two-dimensional (2D) surface grating coupler [D. Taillaert, et al., "A Compact Two-Dimensional Grating Coupler Used as a Polarization Splitter", IEEE Photon. Technol. Lett. vol. 15, no. 9, p. 1249 (2003)]. Such a polarization splitting has been used to produce a polarization-division multiplexed receiver based on submicron SOI circuits [C. R. Doerr and L. Chen, "Monolithic PDM-DQPSK receiver in silicon", Proc. of ECOC 2010, paper PD3-6 (2010)].

Photonic-integrated circuits based on large waveguides (i.e. with a width and height in the range between about 2 and 4 micrometers) supporting both polarizations have also been used to implement integrated receivers [M. Kroh et al., "Hybrid Integrated 40 Gb/s DPSK Receiver on SOI", Proc. of OFC 2009, paper OMK3 (2009); and L. Zimmermann et al., "Towards Silicon on Insulator DQPSK Demodulators", Proc. of OFC 2010, paper OThB3 (2010)]. However, in addition to sacrificing the high compactness provided by submicron waveguides, polarization-insensitivity remains a challenge as both polarizations propagate into the waveguides of the device with slightly different velocities, thereby leading to a polarization-dependent operation. This difference in velocity results in a polarization-dependent frequency shift (PDFS), which corresponds to a spectral shift between the respective spectra of optical elements, such as interferometers, of an optical device supporting the propagation of modes with different states of polarization. This phenomenon may originate, for example, from fabrication inaccuracies, material non-uniformities, such as in thickness or refractive index, and thermal fluctuations. An optical receiver is generally considered to provide a polarization-insensitive operation when the PDFS is small, typically when the PDFS less than about 1 GHz.

To ensure a polarization-insensitive operation of an optical receiver based on a polarization diversity approach where the input signal is split into two orthogonal polarization components, the circuits associated with the two polarizations generally need to be identical. This poses significant fabrication challenges in terms of precisely controlling the waveguide dimensions and positioning, which may not achievable even using state-of-the-art CMOS fabrication techniques. Bogaerts et al. addressed this issue by propagating both polarizations through the same circuit but in opposite direction, using an arrayed waveguide grating (AWG) designed such that both polarizations could use the same set of delay lines. However, an approach such as disclosed by Bogaerts et al. and consisting in using a same device for both polarizations but in reverse propagation direction is suitable only for very specific applications. It is not suitable for example in a DPSK or a DQPSK optical receiver.

There therefore exists a need in the art for a compact and integrated optical receiver configured for demodulating phase-modulated optical signals, which exhibits polarization-insensitive operation and reduced sensitivity to non-idealities and uncertainties including fabrication errors and material non-uniformities

SUMMARY OF THE INVENTION

In accordance with an aspect of the invention, there is provided a polarization-insensitive optical receiver for demodulating a phase-modulated input optical signal. The optical receiver includes:

a polarization splitter for splitting the input optical signal into a first and a second polarization component having substantially orthogonal polarization states and for launching the polarization components into a first and a second optical path, respectively;

a first and a second interferometric module respectively disposed in the first and second optical paths to receive a respective one of the first and second polarization components. Each interferometric module includes a delay line receiving a portion of the respective polarization component and producing therefrom a time-shifted version of the respective polarization component, each interferometric module being configured to mix the respective polarization component with the time-shifted version thereof so as to provide a plurality of output signals. Each output signal corresponds to a different relative phase shift between the respective polarization component and the time-shifted version thereof, the delay lines of the first and second interferometric modules being disposed within a same physical region of the optical receiver and defining spiraling structures intertwined with each other; and a plurality of detectors, each detector detecting one of a plurality of combined signals, each combined signal including an output signal from each of the first and second interferometric modules corresponding to a same relative phase shift.

Embodiments according to this aspect of the invention generally provide a compact, polarization-insensitive optical receiver that can be based on submicron silicon-on-insulator circuits and waveguides, so as to provide photonic integration with maximized compactness. In some embodiments, the polarization-insensitive optical receiver is configured to perform a DPSK or a DQPSK demodulation of the phase-modulated input optical signal.

Advantageously, embodiments according to this aspect of the invention can be rendered polarization-insensitive through a polarization diversity approach according to which a phase-modulated input optical signal is split into two substantially orthogonally-polarized components. These two polarization components are then launched into respective optical paths, along which they are differentially demodulated and subsequently recombined prior to being detected by a single set of detectors.

Also advantageously, embodiments according to this aspect of the invention allow mitigating undesired discrepancies between the optical paths associated with the two substantially orthogonal polarization components such as fabrication inaccuracies, material non-uniformities and thermal fluctuations by arranging the delay lines of the first and second interferometric modules into spiraling structures and by intertwining these spiraling structures with each other.

In accordance with another aspect of the invention, there is provided a waveguide assembly. The waveguide assembly includes:

a substrate; and a pair of waveguides disposed within a same physical region of the substrate and defining spiraling structures intertwined with each other, each waveguide being configured to propagate a respective optical signal and including:

a pair of adjacent and substantially parallel winding segments, one of the winding segments receiving the respective optical signal and defining an inwardly-directed optical path for guiding the respective optical signal inside the spiraling structure, and the other winding segment defining an outwardly-directed optical path for guiding the respective optical signal outside of the spiraling structure; and a transition segment serially connecting the pair of winding segments and defining a transitional optical path inside of the spiraling structure.

In accordance with a further aspect of the invention, there is provided a waveguide coupling assembly for coupling a pair of optical signals onto a same detector. The waveguide coupling assembly includes:

a pair of parallel and coplanar waveguides, each waveguide guiding one of the optical signals along a respective waveguiding axis, the pair of waveguides being out-of-plane relative to the detector; and a pair of coupling elements, each coupling element being provided in one of the pair of waveguides and configured to couple the corresponding optical signal out of the respective waveguide and to direct the same toward the detector at a respective angle, each angle being chosen so that the pair of optical signals impinge on the detector on a same region thereof.

Other features and advantages of embodiments the present invention will be better understood upon reading of preferred embodiments thereof with reference to the appended drawings.

BRIEF DESCRIPTION OF THE DRAWINGS

FIG. 13 is a schematic representation of a waveguide assembly in accordance with an embodiment of the invention. The waveguide assembly includes a substrate and a pair of waveguides disposed within a same physical region of the substrate and defining spiraling structures intertwined with each other.

DESCRIPTION OF PREFERRED EMBODIMENTS

Figure 1:
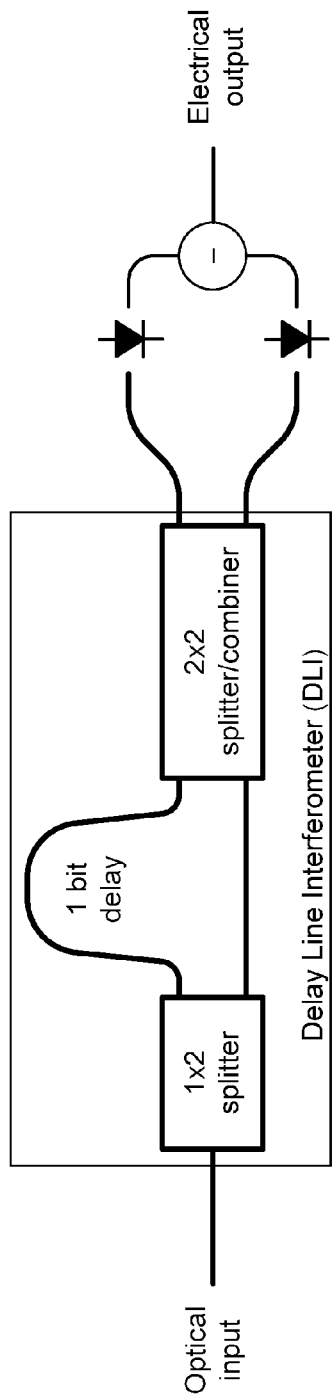
FIG. 1 (PRIOR ART) is a schematic representation of a conventional DPSK optical receiver including a delay line interferometer configured for differentially demodulating an input optical signal modulated according to a DPSK modulation format.
Figure 2:
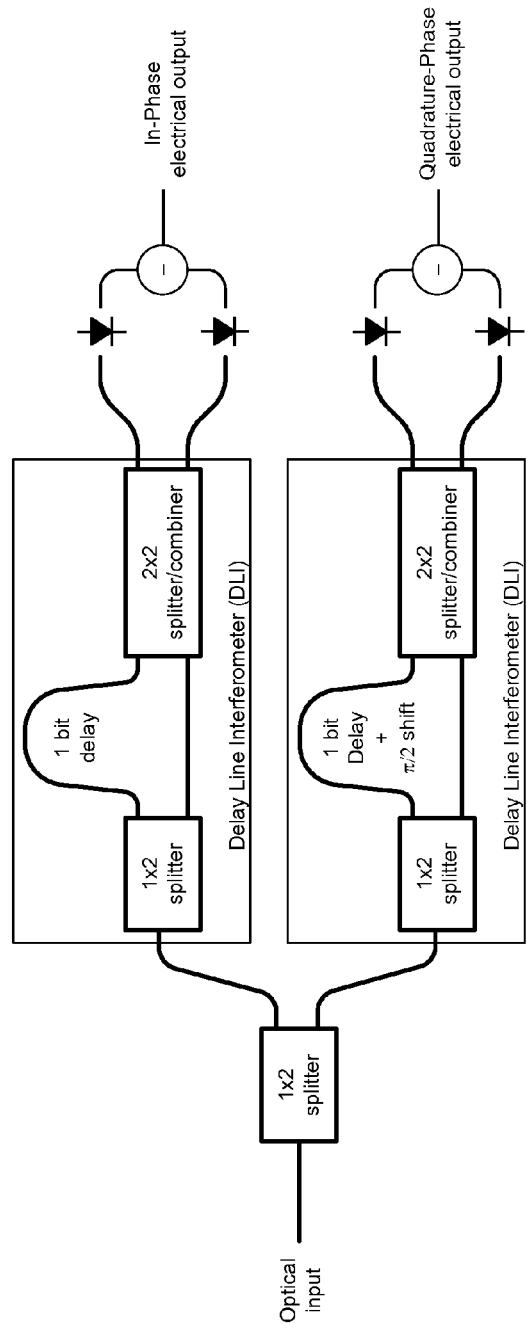
FIG. 2 (PRIOR ART) is a schematic representation of a conventional DQPSK optical receiver including two delay line interferometers configured for differentially demodulating an input optical signal modulated according to a DQPSK modulation format.
Figure 3:
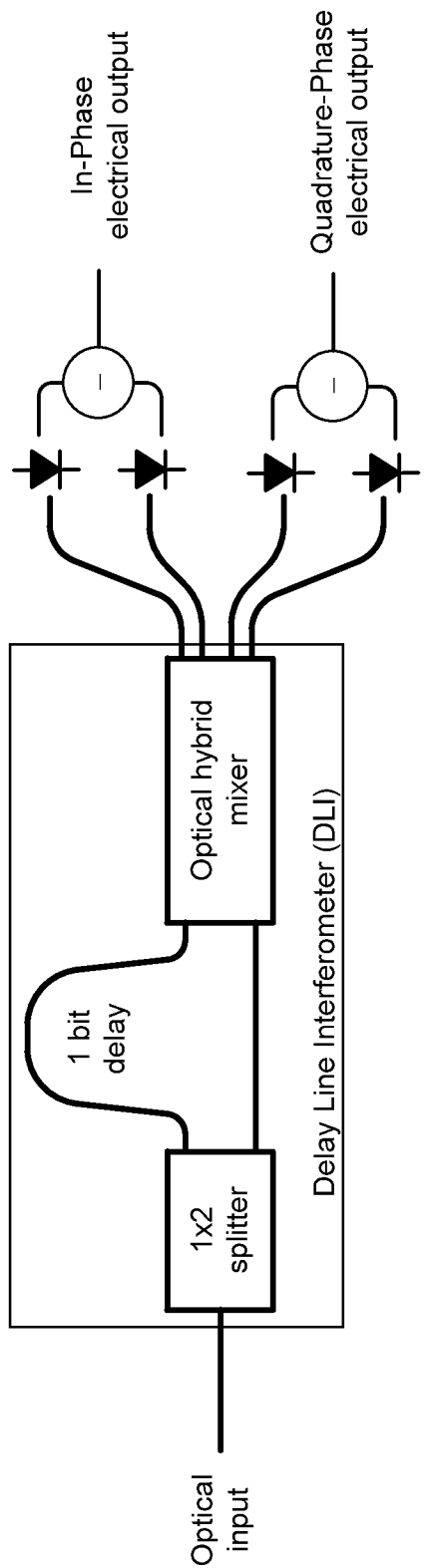
FIG. 3 (PRIOR ART) is a schematic representation of a conventional DQPSK optical receiver including a single delay line interferometer provided with a 90-degree optical hybrid mixer and configured for differentially demodulating an input optical signal modulated according to a DQPSK modulation format.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

Polarization-Insensitive Optical Receiver

In accordance with an aspect of the invention, there is provided a polarization-insensitive optical receiver for demodulating a phase-modulated input optical signal.

Throughout the present description, the expression "polarization-insensitive", when used to characterize the optical receiver according to embodiments of the invention, is understood to refer to an optical receiver capable of demodulating the phase-modulated input optical signal independently of a state of polarization thereof. In other words, two input optical signals that are identical except for their states of polarization will yield identical output signals after being demodulated by the optical receiver according to embodiments of the invention.

The term "phase-modulated signal", when used in connection with the input optical signal demodulated by the optical receiver, is generally intended to refer to an optical signal modulated according to any kind of differentially-encoded phase modulation format including, without limitation, DPSK and multi-level variations thereof such as DQPSK and D8SPK. The information transmitted by the phase-modulated signal is contained in the phase thereof. In other words, the phase of the phase-modulated signal varies in accordance with the information to be conveyed. As known in the art, the information conveyed by a differentially-encoded phase-modulated signal may be recovered by comparing the phase of the signal being received by the optical receiver to the phase of a time-shifted version thereof, thereby enabling the differential-phase-shift-keyed signal to be converted into an amplitude-keyed signal that can be detected using common optical-intensity-sensitive detectors.

In the present description, the terms "polarization-insensitive optical receiver" and "phase-modulated input optical signal" will, at times, be respectively shortened to "optical receiver" and "input optical signal" for the sake of brevity.

As used herein, the terms "light" and "optical" are understood to refer to electromagnetic radiation in any appropriate region of electromagnetic spectrum and are not limited to visible light. For example, in embodiments of the invention for use in the telecommunications industry, the term "light"

and "optical" may encompass electromagnetic radiation with a wavelength included in a range of between about 1520 nm to 1630 nm encompassing the C-band and L-band transmission windows for telecommunication applications, and of between about 1000 nm and 2000 nm for sensing applications.

Embodiments according to this aspect of the invention generally provide a compact, polarization-insensitive optical receiver that can be based on submicron silicon-on-insulator circuits and waveguides, so as to provide photonic integration with maximized compactness. However, one skilled in the art will understand that other embodiments may be applied to different material and structures without departing from the scope of the present invention.

Advantageously, embodiments of the optical receiver can be rendered polarization-insensitive through a polarization diversity approach according to which a phase-modulated input optical signal is first split into two substantially orthogonally-polarized components. These two polarization components are then launched into respective optical paths, along which they are differentially demodulated and subsequently recombined prior to being detected by a single set of detectors. As a result, embodiments of the optical receiver can achieve a polarization-independent demodulation of an input optical signal, regardless of whether the waveguides provided therein support or not the propagation of more than one polarization mode.

Figure 4:
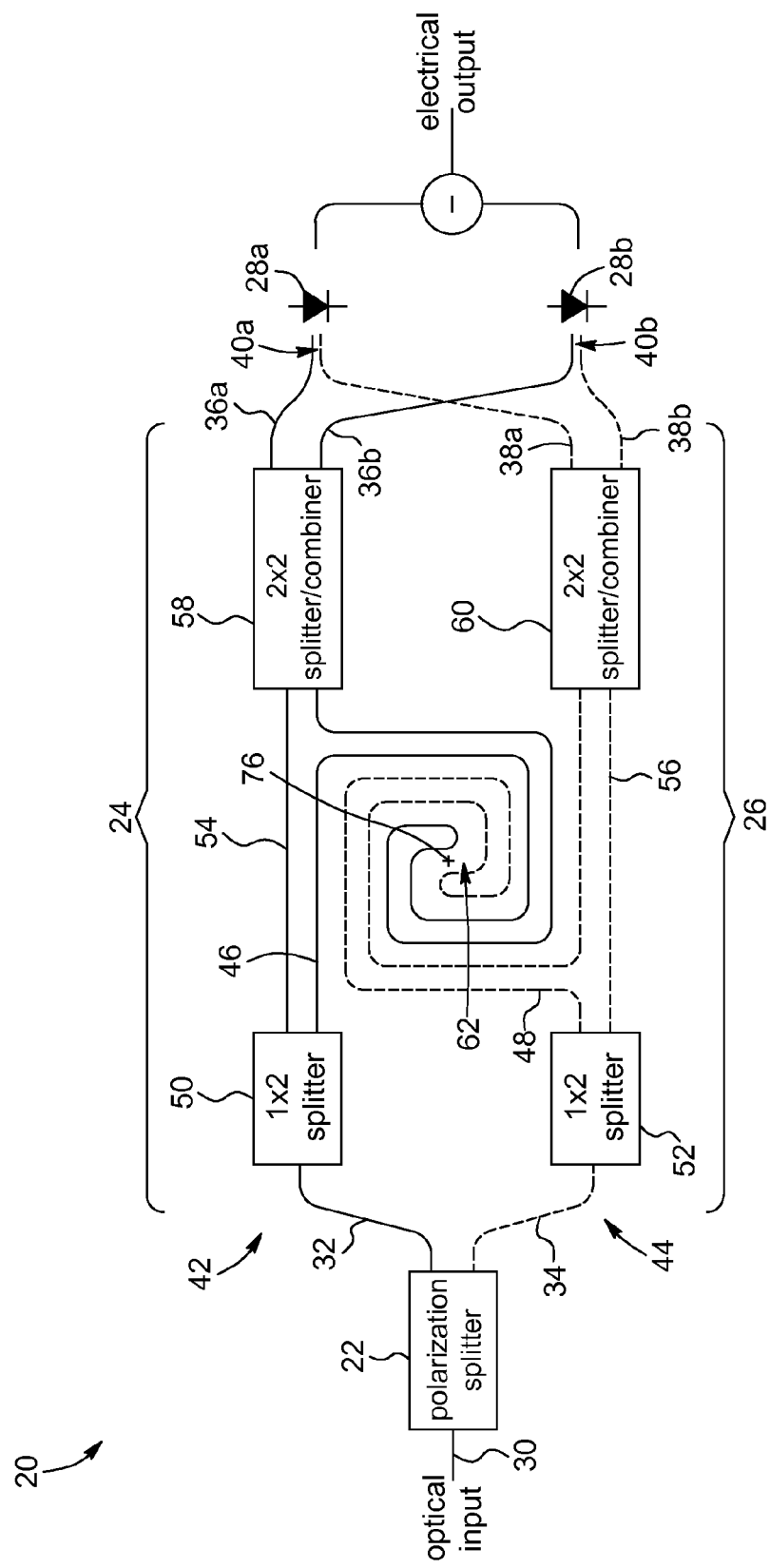
FIG. 4 is a schematic representation of a polarization-insensitive optical receiver for demodulating an input optical signal modulated according to a DPSK modulation scheme, in accordance with an embodiment. The optical paths associated with the first and second polarization components are shown in solid and dashed lines, respectively.
Figure 5:
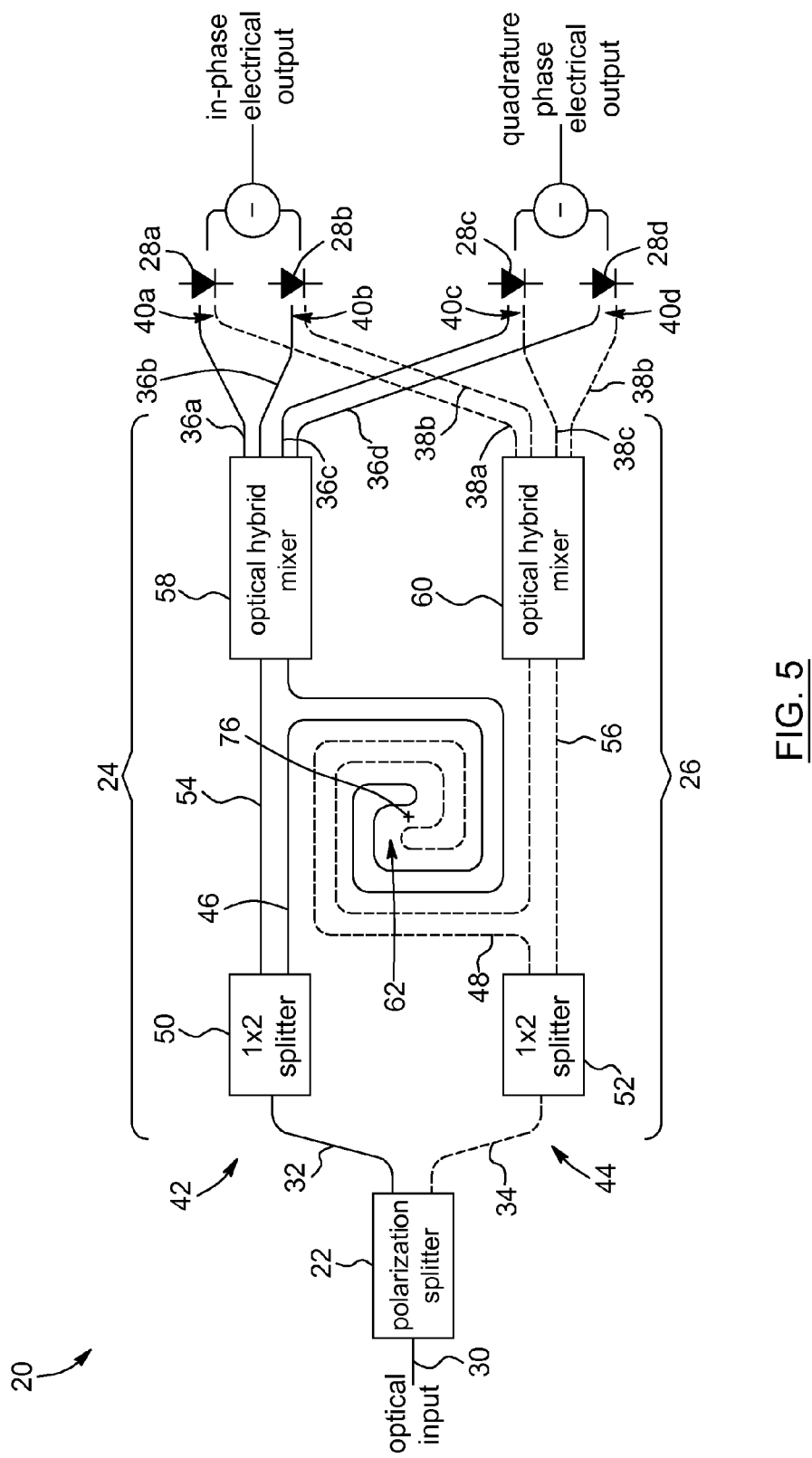
FIG. 5 is a schematic representation of a polarization-insensitive optical receiver for demodulating an input optical signal modulated according to a DQPSK modulation scheme, in accordance with an embodiment. The optical paths associated with the first and second polarization components are shown in solid and dashed lines, respectively.

Referring now to FIG. 4, there is shown a polarization-insensitive optical receiver 20 for demodulating an input optical signal, in accordance with an embodiment of the invention. Broadly described, the optical receiver 20 illustrated in FIG. 4 includes successively a polarization splitter 22, a first and a second interferometric module 24 and 26, and a plurality of detectors 28a, 28b. The optical receiver 20 is configured to receive and demodulate a phase-modulated input optical signal 30. In the embodiment shown in FIG. 4, the input optical signal 30 is modulated according to a DPSK digital modulation format. However, it will be understood that in other embodiments the input optical signal 30 may be modulated according to other differentially-encoded digital modulation formats, for example a DQPSK digital modulation format, as illustrated in the embodiment of FIG. 5.

Referring back to FIG. 4, in operation of the optical receiver 20, the input optical signal 30 is incident upon or enters the optical receiver via the polarization splitter 22 where it is split into a first and a second polarization component 32 and 34. Each polarization component 32 and 34 propagates through the respective interferometric module 24 and 26 and is outputted therefrom as a plurality of output signals 36a, 36b and 38a, 38b. The plurality of output signals 36a, 36b and 38a, 38b are combined pairwise to form a plurality of combined signals 40a, 40b, which are detected by the corresponding plurality of detectors 28a, 28b. It will be understood that the phase-modulated input optical signal 30 is demodulated upon passage through the optical receiver 20, that is, converted from a differential-phase-shift-keyed signal to a plurality of amplitude-keyed signals 36a, 36b and 38a, 38b appropriate for detection by the plurality of detectors 28a, 28b.

With continued reference to FIG. 4, the different elements of the optical receiver 20 according to the illustrated embodiment will now be described in greater detail.

As mentioned above, the polarization-insensitive optical receiver 20 first includes a polarization splitter 22 for splitting the input optical signal 30 into a first and a second polarization component 32 and 34 having substantially orthogonal polarization states and for launching the polarization components 32 and 34 into a first and a second optical path 42 and 44, respectively.

As used herein, the term "polarization splitter" is intended to be interpreted as encompassing any appropriate optical device or combination of optical devices, preferably suitable for use in integrated silicon photonic circuits, and capable of providing spatial separation into two substantially orthogonal polarization components of an input optical signal. In embodiments of the invention, the polarization splitter 22 may for example be embodied by a 2D grating coupler, such as described by D. Taillaert, et al. in "A Compact Two-Dimensional Grating Coupler Used as a Polarization Splitter", *IEEE Photon. Technol. Lett.* vol. 15, no. 9, p. 1249 (2003). Alternatively, the polarization splitter 22 may also be embodied by a polarization splitter such as described by M. R. Watts et al. in "Integrated mode-evolution-based polarization Splitter," *Opt. Lett.*, vol. 30, no. 9, p. 967 (2005), followed, in one of the output, by a polarization rotator such M. R. Watts et al. in "Integrated mode-evolution-based polarization rotators," *Opt. Lett.*, vol. 30, no. 2 p. 138 (2005). Of course, it will be understood that in other embodiments, other configurations than those mentioned above could be envisaged for the polarization splitter 22 without departing from the scope of the invention.

As used herein, the term "optical path" is intended to refer a path to which an optical signal propagating in the optical receiver is confined and guided. In embodiments of the invention, each substantially orthogonal polarization component of the input optical signal propagates along distinct optical paths. It will be understood that in embodiments of the invention, the optical receiver generally includes a silicon-based photonic or other high-index-contrast photonic circuit including a plurality of optical waveguides provided in a substantially integrated configuration. In this context, the term "optical path" is further understood to encompass a plane or an axis of an optical waveguide along which light can be guided. It will be understood by one of ordinary skill in the art that the optical waveguides provided in the embodiments of the optical receiver according to embodiments of the present invention may be embodied by any appropriate planar waveguide including, but not limited to, a slab waveguide, a strip waveguide, a ridge waveguide and a rib waveguide.

Still referring to FIG. 4, the optical receiver 20 also includes a first and a second interferometric module 24 and 26 respectively disposed in the first and the second optical paths 42 and 44 to receive a respective one of the first and second polarization components 32 and 34 from the polarization splitter 22.

As used herein, the term "interferometric module" is intended to refer to a device or combination of devices apt to demodulate a phase-modulated optical signal in the context of the present polarization-insensitive optical receiver and by using the principle of optical interference.

As exemplified in FIG. 4 and described below, the optical signals received and demodulated by of the first and second interferometric modules 24 and 26 according to embodiments of the invention are associated to the first and second polarization components 32 and 34 outputted by the polarization splitter 22, respectively. Each interferometric module 24 and 26 includes a delay line 46 and 48 that receives a portion of the respective polarization component 32 and 34 and that produces therefrom a time-shifted version of the respective polarization component 32 and 34. In the illustrated embodiment, each interferometric module 24 and 26 also includes an optical splitter 50 and 52, which receives the respective polarization component 32 and 34 and split the same into two preferably equal-intensity portions thereof. One portion of the respective polarization component 32 and 34 is launched into the respective delay line 46 and 48, while the remaining portion launched into a respective reference line 54 and 56 of each interferometric module 24 and 26.

It will be understood by one of ordinary skill in the art that the optical path length of each of the delay lines 46 and 48 differs from the optical path length of the corresponding reference lines 54 and 56. More specifically, because of this optical path length difference, a time delay difference exists between the delay line 46 and the reference line 54, thereby producing the time-shifted version of the first polarization component 32. Likewise, a time delay difference exists between the delay line 48 and the reference line 56, thereby producing the time-shifted version of the second polarization component 34. Preferably, each delay line 46 and 48 defines an optical path difference that produces a time delay between the respective polarization component 32 and 34 of the input optical signal 30 and the time-shifted version thereof that corresponds to one bit of the input optical signal 30.

Each interferometric module 24 and 26 is configured to mix the respective polarization component 32 and 34 with the time-shifted version thereof so as to provide a plurality of output signals 36a, 36b and 38a, 38d. The mixing is performed in a manner such that each output signal 36a, 36b and 38a, 38d corresponds to a different relative phase shift between the respective polarization component 32 and 34 and the time-shifted version thereof. It will be understood that each interferometric module 24 and 26 may include any appropriate optical splitting-and-combining coupling device 58 and 60 to perform the mixing of the respective polarization component 32 and 34 with the time-shifted version thereof such as, for example, an MMI coupler or a directional coupler.

In the embodiment illustrated in FIG. 4, each interferometric module 24 and 26 outputs two output signals 36a, 36b and 38a, 38b. In other embodiments, more output signals may be produced. It will thus be understood by one of ordinary skill in the art that the optical receiver according to embodiments of the present invention is not limited by the number of output signals. For example, referring now to FIG. 5, there is illustrated an embodiment of a polarization-insensitive optical receiver 20 configured to perform a DQPSK demodulation of the phase-modulated input optical signal 30, wherein each of the first and second interferometric modules 24 and 26 outputs four output signals 36a to 36d and 38a to 38d. It is noted that this embodiment, the optical splitting-and-combining coupling device 58 and 60 is a 90-degree optical hybrid mixer which, for the purpose of illustration, is embodied by a 2×4 MMI coupler.

As mentioned above, in order to ensure a polarization-insensitive operation of an optical receiver based on a polarization diversity approach where the input optical signal is split into two substantially orthogonal polarization components, it is desirable that the optical paths and circuits associated with the two polarization components be essentially identical. For this reason, the delay lines 46 and 48 of the first and second interferometric modules 24 and 26 preferably have substantially a same optical length, or equivalently, introduce substantially identical time delays between the first and second polarization component 32 and 34 of the input optical signal 30 and the time-shifted version thereof.

However, one of ordinary skill in the art will understand that fulfilling this condition generally poses significant fabrication challenges because integrated photonic waveguides based on silicon or other high-index-contrast photonics typically have submicron dimensions and very stringent fabrication tolerance requirements. Such intrinsic and hard-to-circumvent fabrication non-idealities, which may be of the order of several tens of nanometers, often constitute the source of undesired differences between the optical paths associated with the two substantially orthogonal polarization components. These differences may lead to a PDFS between the respective optical signal spectra of the two interferometric modules 24 and 26, resulting in detrimental impact on circuit yield and performance of the optical receiver 20. Furthermore, in addition to inaccuracies stemming from the fabrication process of the optical receiver 20, PDSF may also be the result of non-uniformities in waveguide geometry and material properties, for example in refractive index, and of thermal fluctuations.

Advantageously, the optical receiver according to embodiments of the invention allows mitigating such detrimental effects on the performance of the optical receiver 20 causing, for example, an unacceptable PDFS between the two interferometric modules demodulating the two substantially orthogonal polarization components of the input signal. More specifically, in embodiments of the invention, fabrication inaccuracies, material non-uniformities and thermal fluctuations can be minimized by intertwining the delay lines of the first and second interferometric modules, as described in greater detail below. This intertwining approach can be applied to both DPSK and DQPSK receivers 20, as illustrated in the embodiments shown in FIGS. 4 and 5. More specifically, in these two embodiments, the respective delay lines 46 and 48 of the first and second interferometric modules 24 and 26 are disposed within a same physical region 62 of the optical receiver 20 and define spiraling structures intertwined with each other. This arrangement over a substantially same physical region 62 allows averaging out phase errors in the optical signal that could otherwise accumulate and lead to unacceptable optical path differences.

As used herein, the term "intertwined" is intended to refer to a state of mutual entanglement or interlaced interrelationship between the first and second delay lines. Furthermore, the term "spiraling structure", when used in connection with the overall arrangement of the first and second delay lines, should be interpreted broadly and is intended to mean that each of the first and second delay lines defines a winding geometrical pattern or configuration that generally emanates from a point on the physical region of the optical receiver and moves progressively further away from that point in units of increasing size.

Figure 10:
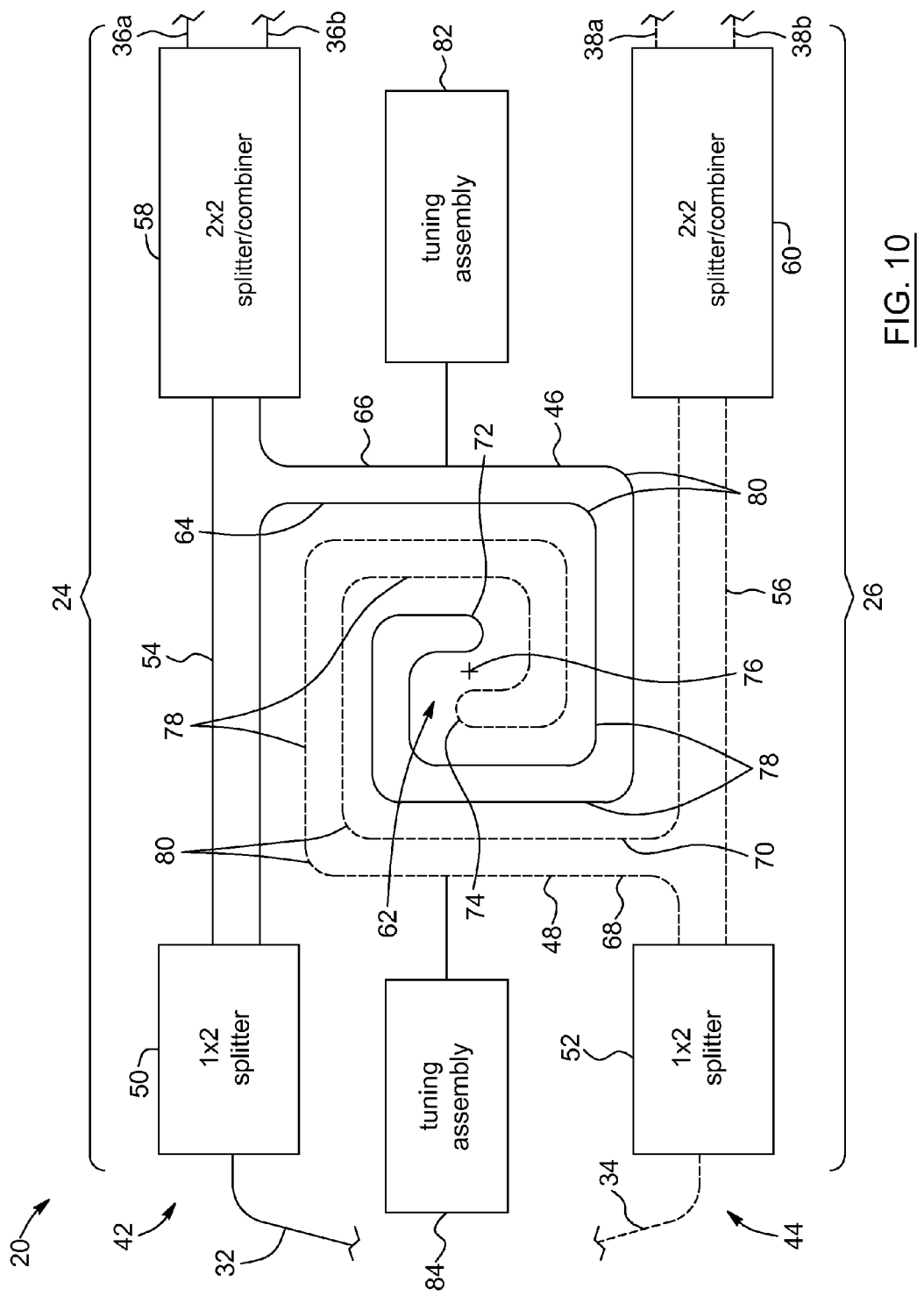
FIG. 10 is an enlarged portion of the physical region of the embodiment of the optical receiver shown in FIG. 4 within which are disposed the delay lines of the first and second interferometric modules.

Referring now to FIG. 10 there is shown an enlarged representation of the physical region 62 of the optical receiver 20 of FIG. 4 within which are disposed the first and second delay lines 46 and 48. The first and second delay lines 46 and 48 preferably includes a pair of adjacent and substantially parallel winding segments 64, 66 and 68, 70, and a transition segment 72 and 74 serially connecting the pair of winding segments 64 and 66 and defining a transitional optical path inside of the spiraling structure. Each of the transition segments 72 and 74 may be embodied by a 180-degree waveguide bend.

For example, in the case of the first delay line 46, one winding segment 64 receives the portion of the first polarization components 32 that is launched into the first delay line 46 and defines an inwardly-directed optical path for guiding the portion of the first polarization component 32 inside the spiraling structure defined by the first delay line 46. The other winding segment 66 of the first delay line 46 defines an outwardly-directed optical path for guiding the portion of the first polarization component 32 outside of the spiraling structure. Likewise, for the second delay line 48, one winding segment 68 receives the portion of the second polarization components 34 that is launched into the second delay line 48 and defines an inwardly-directed optical path for guiding the portion of the second polarization component 34 inside the spiraling structure defined by the second delay line 46. The other winding segment 70 defines an outwardly-directed optical path for guiding the portion of the second polarization component 34 outside of the spiraling structure.

It will be understood that in order to further minimize the detrimental impact of fabrication inaccuracies, waveguide geometry non-uniformities, material non-uniformities and thermal fluctuations on the performance of the optical receiver 20, it may desirable that the intertwined spiraling structures defined by the first and second delay lines 46 and 48 assume symmetrical configurations. For example, in FIGS. 4 and 5, as well as in the alternative embodiments shown in FIGS. 8 and 9, the first and second delay lines 46 and 48 are shaped and arranged so as to have 180-degree rotation symmetry about a virtual rotation axis 76 which is perpendicular to a plane of the physical region 62 of the optical receiver 20 on which are disposed the first and second delay lines 46 and 48. It is to be noted that the virtual rotation axis 76 is perpendicular to the page in FIGS. 4, 5, 8 and 9.

Referring back to FIG. 10, each winding segment 64, 66 and 68, 70 of each delay line 46 and 48 may include a plurality of straight sections 78 serially-connected to one another by 90-degree bend sections 80, with adjacent straight sections 78 extending at substantially right angle relative to each other. Of course, it will be understood that the number of straight sections 78 of each winding segment 64, 66 and 68, 70 in the embodiments shown in FIG. 10 is provided for illustrative purposes and may be varied depending on different factors such as, for example, the waveguide geometry, the waveguide proximity, and the desired optical delay.

The first and second delay lines 46 and 48 can also be arranged into intertwined spiraling structures with particularities that can take into account some expected sources of fabrication errors. For example, if the waveguide effective index is expected to exhibit a small linear variation as a function of position along the plane of the physical region 62, the first and second delay lines 46 and 48 could both be arranged in the physical region 62 in a manner such that their average waveguide effective index would correspond to the value of the waveguide effective index at a common center of the spiraling structures. An example of such an arrangement is illustrated in the alternative embodiment of the optical receiver shown in FIG. 8 and in the enlarged representation thereof shown in FIG. 11. It is to be noted that in this embodiment, the center of the spiraling structures defined above coincides with the virtual rotation axis 76 indicated in FIGS. 8 and 11.

Figure 11:
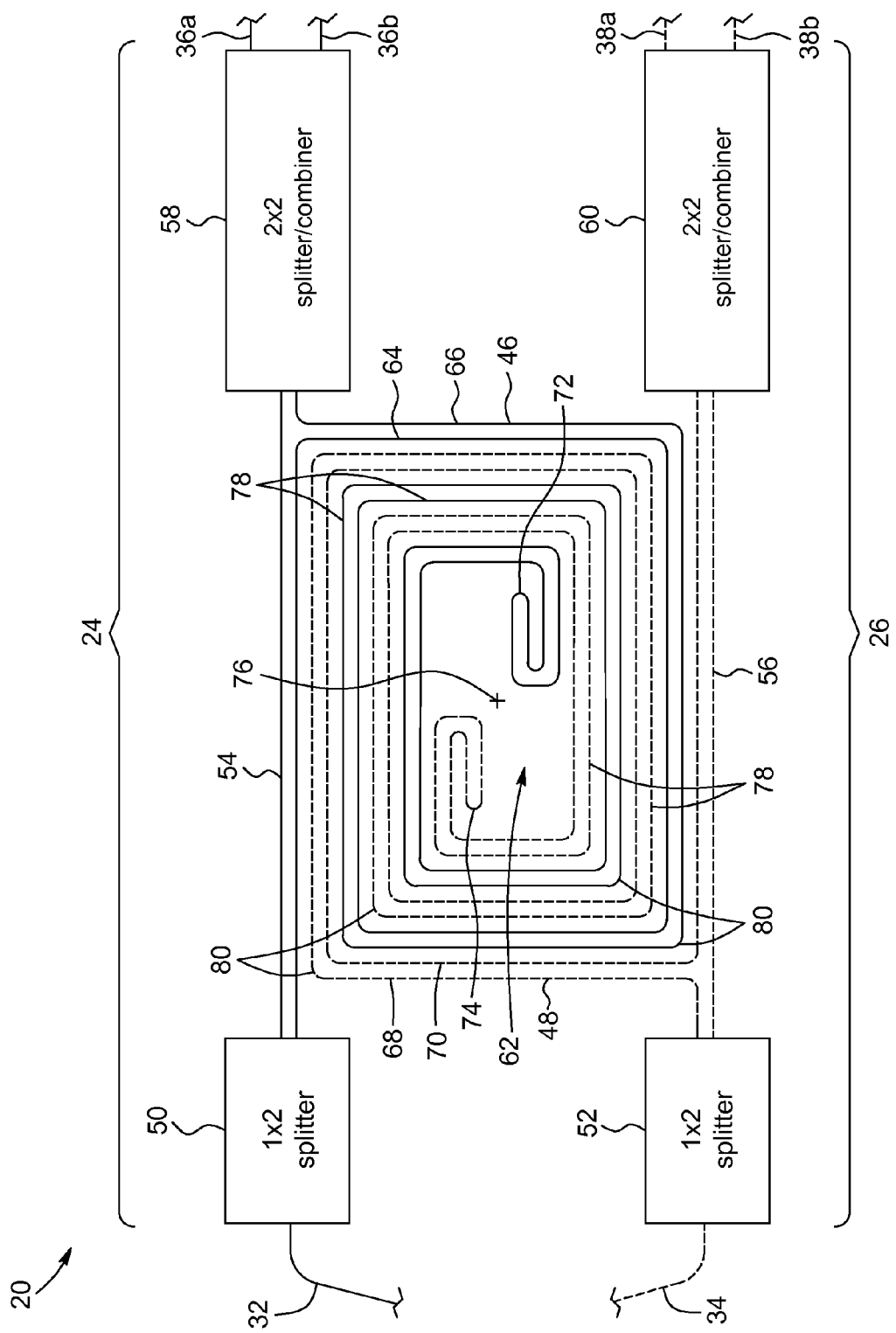
FIG. 11 is an enlarged portion of the physical region of the embodiment of the optical receiver shown in FIG. 8 within which are disposed the delay lines of the first and second interferometric modules.

Moreover, as shown in FIG. 11, the spiraling structures may be arranged such that the average geometrical position of each of the first and second delay lines 46 and 48 coincides substantially with each other and with the center of the physical region 62. By analogy with the concept of "center of mass" used in mechanics, the term "average geometrical position", when used in connection one of the first and second delay lines, is intended to refer to the point of the physical region of the optical receiver where the sum of the relative position of each elementary element of the delay line with respect to that point is equal to zero.

Each interferometric module 24 and 26 may include a tuning assembly 82 and 84 for adjusting an optical path difference introduced by the respective delay line 46 and 48 thereof, as illustrated in the embodiment of FIG. 4. As one of ordinary skill in the art will readily understand, the tuning assemblies 82 and 84 may be embodied by any appropriate device or combination of devices apt to adjust the effective refractive index of the first and second delay lines 46 and 48 and may include electro-optic and thermo-optic devices, which take advantage of the dependence of the effective refractive index on an applied electrical field or temperature variation, respectively. Moreover, in other embodiments, as illustrated in FIG. 5, the optical receiver 20 may include a single tuning assembly 86 for simultaneously adjusting optical path differences introduced by the respective delay lines 46 and 48 of the first and second interferometric modules 24 and 26.

Referring back to FIG. 4, the optical receiver 20 further includes a plurality of detectors 28a, 28b, each detector 28a, 28b detecting one of a plurality of combined signals 40a, 40b. In this embodiment, the optical receiver 20 functions as a DPSK demodulator and the plurality of detectors 28a, 28b includes a pair of detectors.

As used herein, the term "detector" generally refers to an optical-intensity-sensitive device capable of providing an electrical output photocurrent proportional to the light intensity the combined signal impinging thereonto. The detectors 28a, 28b are preferably embodied by photodiodes, but any other type of appropriate photosensitive sensor may be used without departing from the scope of the invention.

As mentioned above, each combined signal 40a, 40b includes an output signal 36a, 36b and 38a, 38b from each of the first and second interferometric modules 24 and 26 corresponding to a same relative phase shift. For example, the combined signal 40a detected by the detector 28a represents the sum of the output signal 36a corresponding to a particular relative phase shift between the first polarization component 32 and the time-shifted version thereof, and of the output signal 38a corresponding to the same relative phase shift between the second polarization component 34 and the time-shifted version thereof. It will be understood that it is an advantageous aspect of the optical receiver according to embodiments of the present invention to combine, in a single set of detectors, the substantially orthogonally-polarized output signals propagating along the first and second optical paths and demodulated by the first and second interferometric modules.

In the embodiment of FIG. 5, the optical receiver 20 functions as a DQPSK demodulator so that the plurality of detectors 28a to 28d includes four detectors, each detecting one of the four combined signals 40a to 40b. Likewise, each of the four combined signals 40a to 40b includes an output signal 36a to 36b and 38a to 38b from each of the first and second interferometric modules 24 and 26 corresponding to a same relative phase shift. Preferably, in some embodiments of the invention, the plurality of detectors 28a to 28d and the plurality of combined signals 40a to 40d include at least one pair of detectors 28a to 28d and at least one pair of combined signals 40a to 40d, respectively. In such embodiments, a balanced detection scheme may be performed on the at least one pair of photocurrent outputs generated by the at least one pair of detectors 28a to 28d.

As known in the art, a "balanced detection" refers to a detection scheme wherein two signals are subtracted one from the other, or otherwise combined, so as eliminate any unwanted components. For example, in the illustrated embodiment, balanced detection allows suppressing direct current (DC) and noise terms while doubling the useful signal photocurrent. As one skilled in the art will understand, because the DQPSK optical receiver 20 of FIGS. 5 is provided with balanced-detection capabilities, it will produce both an in-phase and a quadrature-phase output photocurrent.

Figure 8:
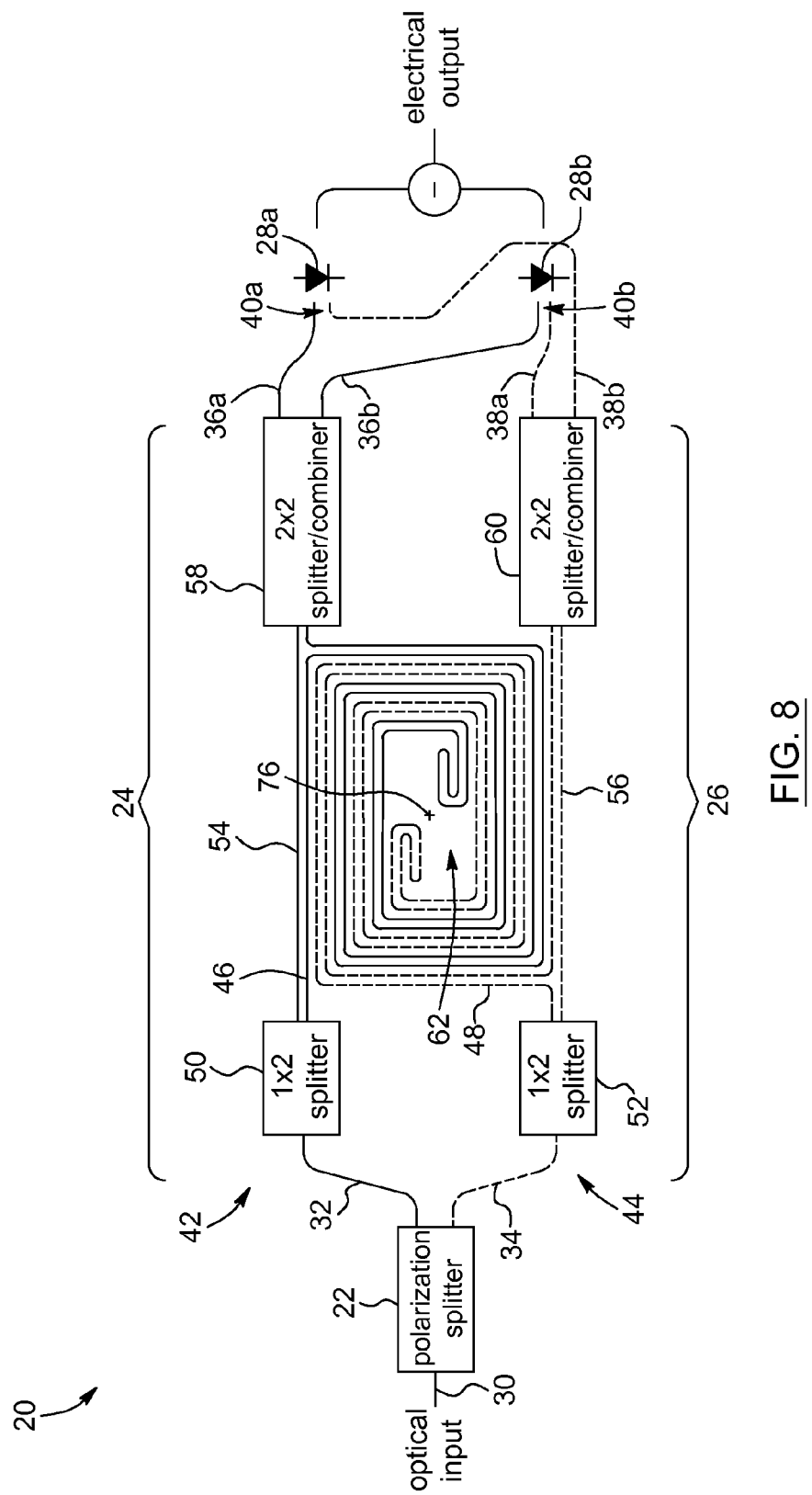
FIG. 8 is a schematic representation of a polarization-insensitive optical receiver for demodulating an input optical signal modulated according to a DPSK modulation scheme, in accordance with an embodiment. The optical paths associated with the first and second polarization components are shown in solid and dashed lines, respectively. The embodiment shown in FIG. 8 is substantially identical to the embodiment of FIG. 4, except for the configuration of the spiraling structures defined by the first and second delay lines.
Figure 9:
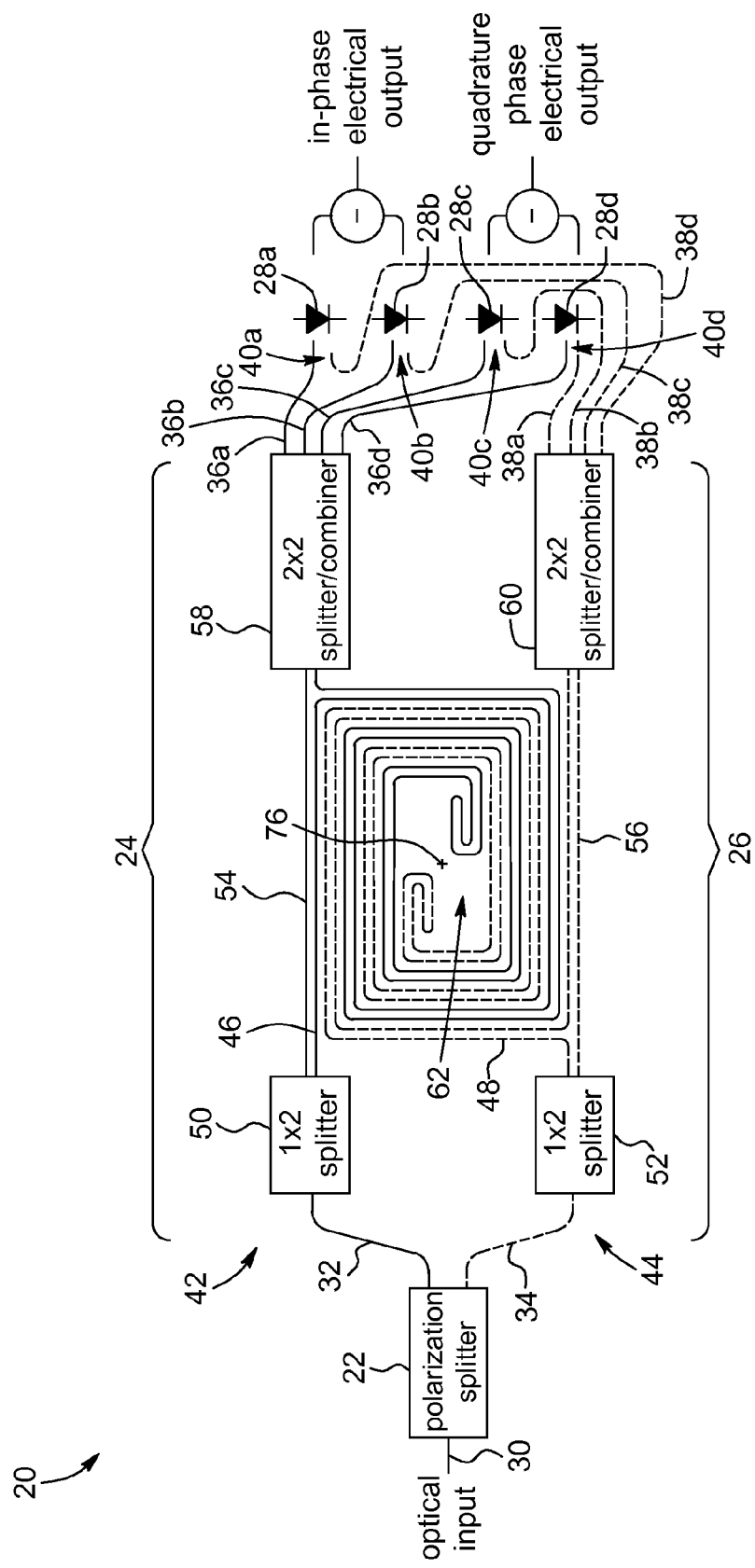
FIG. 9 is a schematic representation of a polarization-insensitive optical receiver for demodulating an input optical signal modulated according to a DQPSK modulation scheme, in accordance with an embodiment. The optical paths associated with the first and second polarization components are shown in solid and dashed lines, respectively. The embodiment shown in FIG. 9 is substantially identical to the embodiment of FIG. 5, except for the configuration of the spiraling structures defined by the first and second delay lines.

It is to be noted that the embodiments shown in FIGS. 4, 8 and 9 also include balanced detection.

Figure 6:
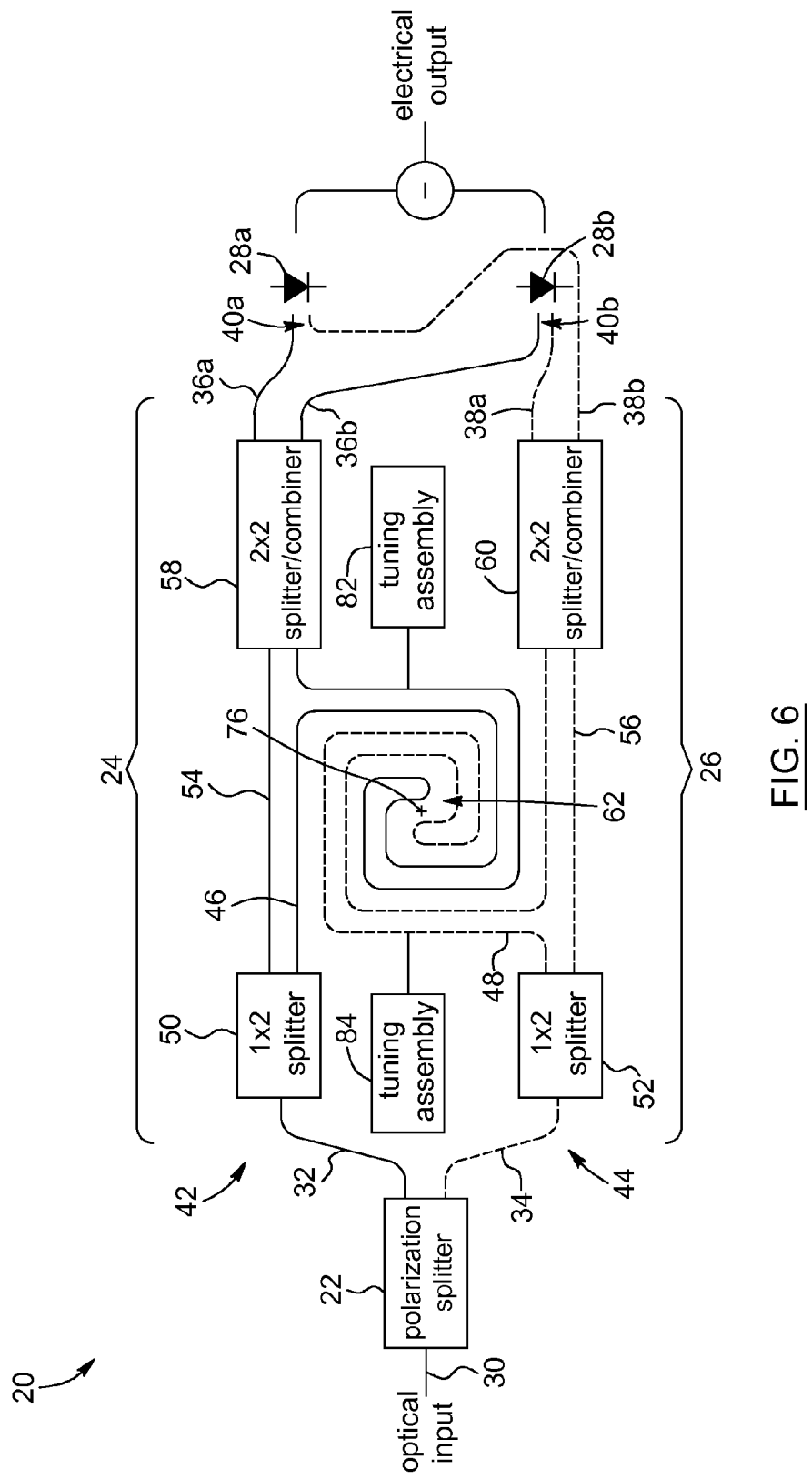
FIG. 6 is a schematic representation of a polarization-insensitive optical receiver for demodulating an input optical signal modulated according to a DPSK modulation scheme, in accordance with an embodiment. The optical paths associated with the first and second polarization components are shown in solid and dashed lines, respectively. The embodiment shown in FIG. 6 is substantially identical to the embodiment of FIG. 4, except that the plurality of pairs of substantially orthogonally-polarized output signals is routed to the plurality of detectors without waveguide crossing.
Figure 7:
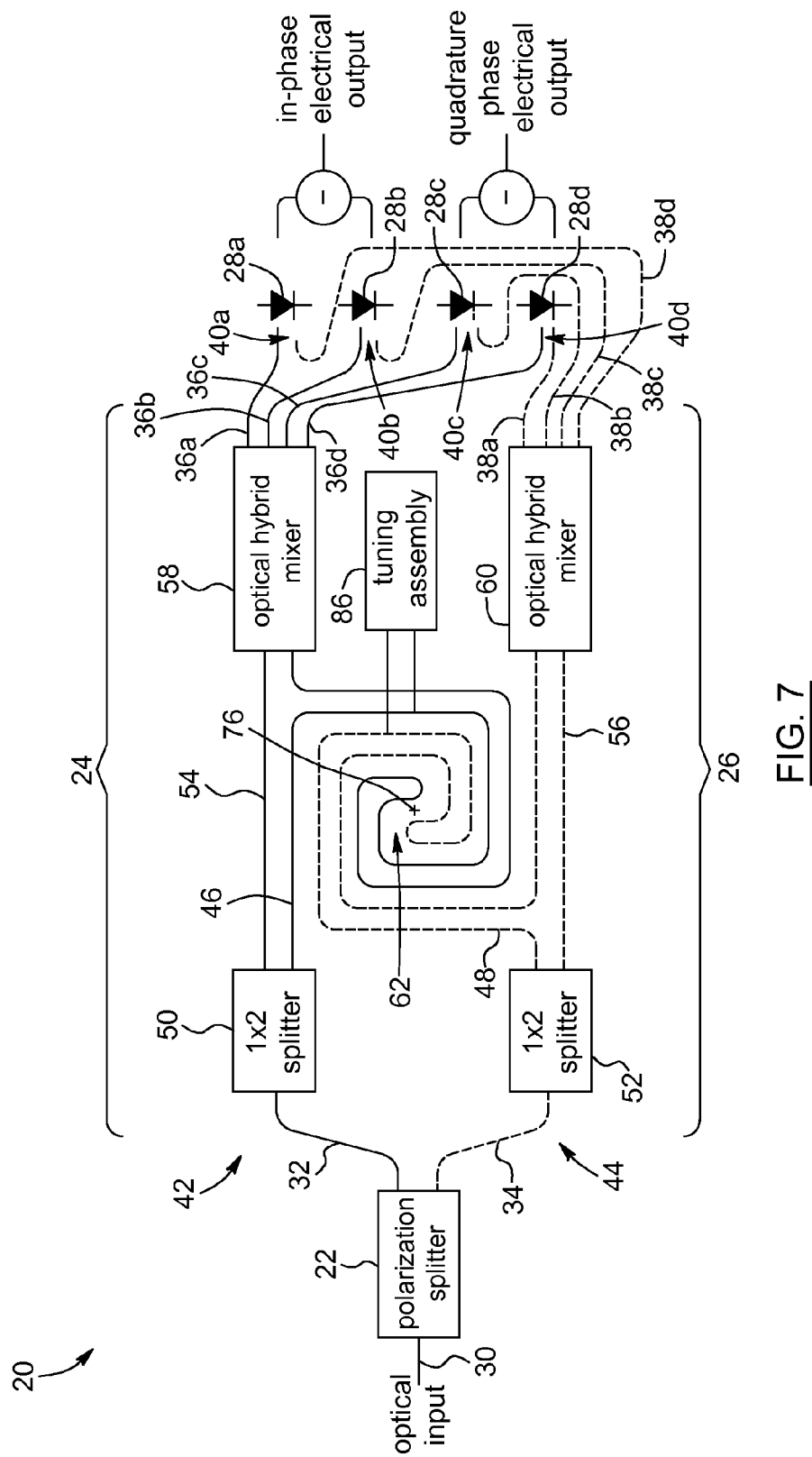
FIG. 7 is a schematic representation of a polarization-insensitive optical receiver for demodulating an input optical signal modulated according to a DQPSK modulation scheme, in accordance with an embodiment. The optical paths associated with the first and second polarization components are shown in solid and dashed lines, respectively. The embodiment shown in FIG. 7 is substantially identical to the embodiment of FIG. 5, except that the plurality of pairs of substantially orthogonally-polarized output signals is routed to the plurality of detectors without waveguide crossing.

In some embodiments of the optical receiver 20, such as that shown in FIG. 4, the plurality of waveguide circuits guiding the plurality of output signals 36a, 36b and 38a, 38b between the first and second interferometric modules 24 and 26 and the plurality of detectors 28a, 28b may include waveguide crossing. Indeed, it is known in the art that, under particular conditions, waveguide crossing can be implemented in silicon-based integrated photonic wave with acceptable performance levers and negligible loss and crosstalk [see, e.g., W. Bogaerts et al., "Low-loss, low-crosstalk crossings for silicon-on-insulator nanophotonic waveguides", *Opt. Lett.* vol. 32, no. 19, p. 2801 (2007)]. Alternatively, in other embodiments, such as that shown in FIG. 6, the waveguide circuits extending between the first and second interferometric modules 24 and 26 and the plurality of detectors 28a, 28b can be achieved without waveguide crossing, for example by taking advantage of the fact that submicron silicon-based photonic waveguides allows for bending waveguides with small curvature radii. FIGS. 5 and 7 show embodiments of the optical receiver 20 configured for DQPSK demodulation with and without waveguide crossing, respectively.

In some embodiments of the polarization insensitive optical receiver 20, the plurality of detectors 28a, 28b may be fabricated on a same SOI photonic chip as that containing the first and second optical paths 42 and 44 [see, e.g., L. Vivien et al., "42 GHz p.i.n. germanium photodetector integrated in a silicon-on-insulator waveguide", *Opt. Expr.*, vol. 17, no. 8, p. 6252 (2009)].

In other embodiments of the polarization insensitive optical receiver 20, the plurality of detectors 28a, 28b may be fabricated on one or several separate dies and flip-chipped on top of the SOI photonic chip that contains the first and second optical paths 42 and 44 [see, e.g., M. Kroh et al., "Hybrid Integrated 40 Gb/s DPSK Receiver on SOI", *Proc. of OFC* 2009, paper OMK3 (2009)]. In this latter case, as explained below, it may be possible to couple the output signals 36a, 36b and 38a, 38b to the plurality of detectors 28a and 28b by using surface grating couplers [see, e.g., D. Vermeulen et al., "High-efficiency Silicon-On-Insulator Fiber-to-Chip Grating Couplers Using a Silicon Overlay", *IEEE International Conference on Group IV Photonics (GFP)*, (2009)].

Figure 12A:
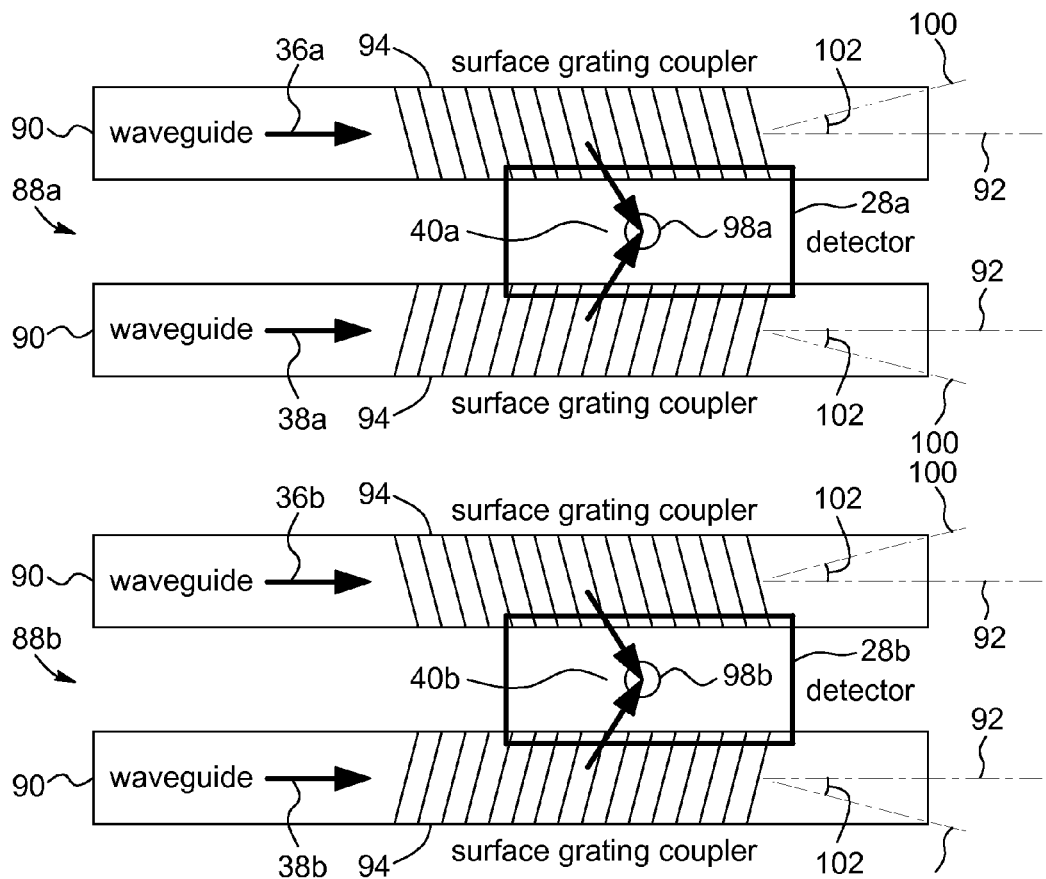
FIGS. 12A and 12B are schematic top and side views of a pair of coupling assemblies of an optical receiver, in accordance with an embodiment.
Figure 12B:
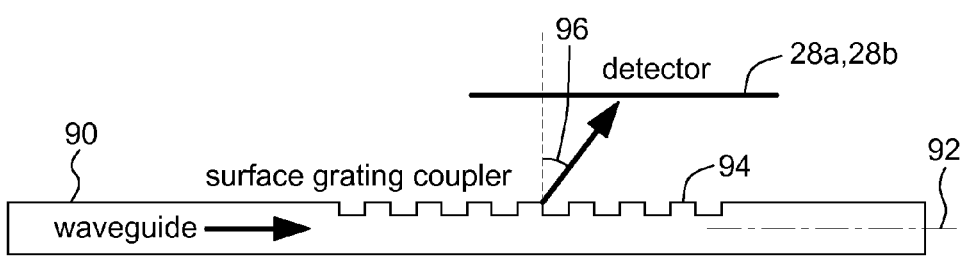

Referring to FIGS. 12A and 12B, in some embodiments the polarization-insensitive optical receiver 20 may further include a plurality of coupling assemblies 88a, 88b. Each coupling assembly 88a, 88b is configured to combine, as one of the combined signals 40a, 40b and onto one of the plurality of detectors 28a, 28b, one of the output signals 36a, 36b and 38a, 38b from each of the first and second interferometric modules 24 and 26 corresponding to the same relative phase shift.

Moreover, each coupling assembly 88a, 88b first includes a pair of parallel and coplanar waveguides 90. As mentioned above with respect to other waveguide structures, the two parallel and coplanar waveguides generally refer to optical waveguides disposed on a same plane, for example on a same substrate. The waveguides 90 may be embodied by any appropriate planar waveguide including, but not limited to, a slab waveguide, a strip waveguide, a ridge waveguide and a rib waveguide, and may be based on silicon or other high-index-contrast-based integrated photonic technologies.

Each waveguide 90 of each coupling assembly 88a, 88b guides one of the output signals 36a, 36b and 38a, 38b along a respective waveguiding axis 92. More specifically, for the first coupling assembly 88a, each waveguide 90 guides one of the substantially orthogonally-polarized output signals 36a and 38a outputted by the first and second interferometric modules 24 and 26 Likewise, for the second coupling assembly 88b, each waveguide 90 guides one of the substantially orthogonally-polarized output signals 36b and 38b outputted by the first and second interferometric modules 24 and 26. Moreover, the two parallel and coplanar waveguides 90 of each coupling assembly 88a, 88b are out-of-plane relative to the corresponding detector 28a, 28b. In other words, the waveguides 90 of each coupling assembly 88a, 88b and the corresponding detectors 28a, 28b extends along different vertically spaced-apart horizontal planes, wherein the terms "horizontal" and "vertical" refer respectively to directions parallel and perpendicular to the plane formed by the two waveguides 90.

In this regard and still referring to FIGS. 12A and 12B, each coupling assembly 88a, 88b also includes a pair of coupling elements 94. For each coupling assembly 88a, 88b, each coupling element 94 is provided in one of the waveguides 90 and is configured to couple the corresponding output signal 36a, 36b and 38a, 38b out of the respective waveguide 90 and to direct the same toward one of the detectors 28a, 28b at a respective angle 96 with respect to the plane of the waveguide 90. This angle 96 is chosen so that the output signals 36a, 36b and 38a, 38b corresponding to the same relative phase shift impinge on the respective detector 28a, 28b on a same region 98a, 98b thereof.

In the illustrated embodiment, each coupling element 94 is a surface grating coupler provided in a respective one of the waveguides 90. The surface grating coupler has a periodicity axis 100 that forms a non-zero angle 102 with the waveguiding axis 92 of the respective waveguide 90. It will be understood that in other embodiments and depending on factors such as the position of the detector 28a, 28b with respect to the two waveguides 90, the non-zero angle 102 between the waveguiding and periodicity axes 92 and 100, and thus the out-of-plane angle 96 with respect to the plane of the waveguides 90 need not be the same for the two waveguides 90.

Alternatively, it would also be possible to use a single two-dimensional grating to output the light coming the two polarization paths onto a single detector [see D. Taillaert, et al., "A Compact Two-Dimensional Grating Coupler Used as a Polarization Splitter", *IEEE Photon. Technol. Lett.* vol. 15, no. 9, p. 1249 (2003)]. However, the diffraction efficiency is typically lower for two-dimensional gratings with respect to one-dimensional gratings and accordingly the approach depicted in FIG. 12 may particularly advantageous in embodiments of the polarization-insensitive optical receiver 20.

Waveguide Assembly

It will be understood that some features of the embodiments of optical receivers described above may also be of use in different types of devices.

Figure 14:
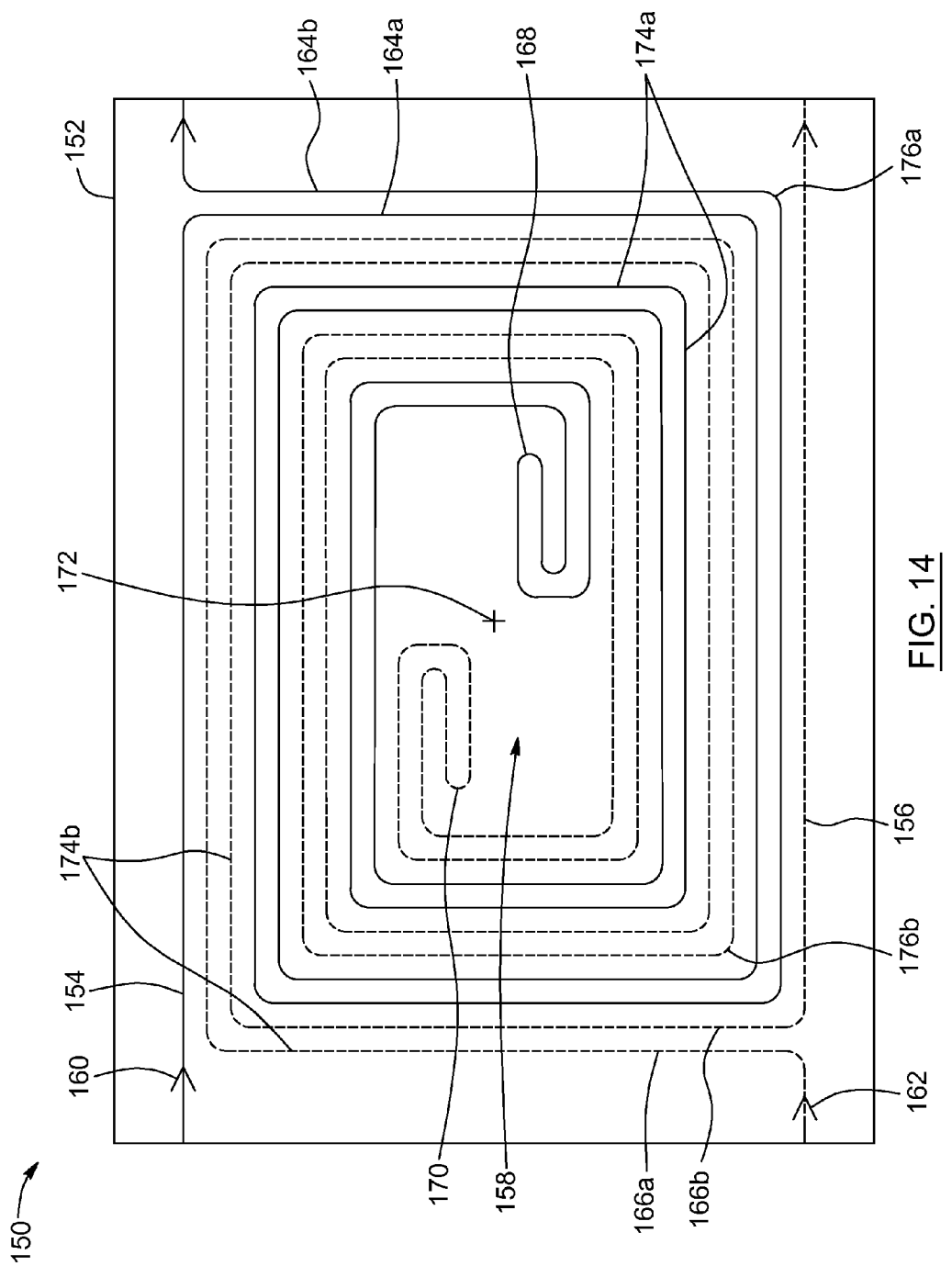
FIG. 14 is a schematic representation of a waveguide assembly in accordance with another embodiment of the invention. The waveguide assembly includes a substrate and a pair of waveguides disposed within a same physical region of the substrate and defining spiraling structures intertwined with each other.

Indeed, in accordance with another aspect of the invention, there is provided a waveguide assembly 150, two exemplary embodiments of which are shown in FIGS. 13 and 14. Broadly described, the waveguide assembly 150 according to this aspect of the invention generally includes a substrate 152 and a pair of waveguides 154 and 156 disposed within a same physical region 158 of the substrate 152 and defining spiraling structures intertwined with each other, such as described above in connection with the intertwined delay lines of the polarization-insensitive optical receiver. Each waveguide 154 and 156 is configured to propagate a respective optical signal 160 and 162 and may be embodied by any appropriate planar waveguide including, but not limited to, a slab waveguide, a strip waveguide, a ridge waveguide and a rib waveguide. Preferably, the two waveguides 154 and 156 have the same length.

The waveguide assembly 150 according to this aspect of the invention is generally adapted for use in photonic circuits based on silicon or other high-index-contrast-based integrated technologies where it is desired to minimize discrepancies in terms of fabrication inaccuracies, waveguide and material non-uniformities and thermal fluctuations experienced by two waveguides propagating two optical signals along distinct optical paths. Embodiments according to this aspect of the invention contribute to mitigating these detrimental effects by arranging the two waveguides as spiraling structures intertwined with each other on a same region of the substrate.

In some embodiments, the waveguide assembly 150 may be used to provide two intertwined delay lines, as described above in connection with embodiments of the polarization-insensitive optical receiver 20 such as those shown in FIGS. 4 to 11. However, it will be understood that embodiments of the waveguide assembly 150 are not limited for use in the delay lines of polarization-insensitive optical receivers but may be useful in any waveguide circuit where it is desired that the optical path of two independent optical signals be maintained as identical as possible.

Referring back to FIGS. 13 and 14, each of the pair of waveguides 154 and 156 includes a pair of adjacent substantially parallel winding segments 164a, 164b and 164a, 164b, and a transition segment 168 and 170 serially connecting the pair of winding segments 164a, 164b and 166a, 166b and defining a transitional optical path inside of the spiraling structure. Each of the transition segments 168 and 170 may be embodied by a 180-degree waveguide bend.

More specifically, the first winding segment 164a and 166a of each waveguide 154 and 156 receives the respective optical signal 160 and 162 and defines an inwardly-directed optical path for guiding the respective optical signal 160 and 162 inside the respective spiraling structure defined by each waveguide 154 and 156. The second winding segment 164b and 166b each waveguide 154 and 156 defines an outwardly-directed optical path for guiding the respective optical signal 160 and 162 outside of the spiraling structure.

As mentioned above in connection with the delay lines of the polarization-insensitive optical receiver, discrepancies in how fabrication inaccuracies, material non-uniformities and thermal fluctuations affect the two waveguides 154 and 156 may be further reduced when the intertwined spiraling structures defined by the waveguides 154 and 156 assume symmetrical configurations. For example, in FIGS. 13 and 14, the first and second waveguides 154 and 156 are shaped and arranged so as to have 180-degree rotation symmetry about a virtual rotation axis 172, which is perpendicular to a plane of the substrate 152 (and perpendicular to the page in FIGS. 13 and 14).

Each winding segment 164a, 164b and 166a, 166b may include a plurality of straight sections 174a, 174b serially-connected to one another by 90-degree bend sections 176a, 176b, with adjacent straight sections 174a, 174b extending at substantially right angle relative to each other. Of course, it will be understood that the number of straight sections 174a, 174b of each winding segment 164a, 164b and 166a, 166b in the embodiments shown in FIGS. 13 and 14 is provided for illustrative purposes and may be varied depending on different factors such as, for example, the waveguide geometry, the waveguide proximity and the desired optical delay.

In some embodiments, the first and second waveguides 154 and 156 may also be arranged into intertwined spiraling structures with particularities that can take into account some expected sources of fabrication errors. For example, if the waveguide effective index is expected to exhibit a small linear variation as a function of position along the plane of the same region 158 of the substrate 152, the first and second waveguides 154 and 156 could both be arranged in the region 158 in a manner such that their average waveguide effective index would correspond to the value of the waveguide effective index at a common center of the spiraling structures. An example of such an arrangement is illustrated in the alternative embodiment of the optical receiver shown in FIG. 14. It is to be noted that in this embodiment, the center of the spiraling structures defined above coincides with the virtual rotation axis 172 indicated in FIG. 14.

Moreover, as shown in FIG. 14, the spiraling structures may be arranged such that the average position, or center of mass, of each of the first and second waveguides coincides substantially with each other and with the geometrical center of the region 158. As mentioned above and by analogy with the concept of "center of mass" used in mechanics, the term "average geometrical position", when used in connection with one of first and second waveguides, is intended to refer to the point of the physical region of the optical receiver where the sum of the relative position of each elementary element of the waveguide with respect to that point is equal to zero.

Waveguide Coupling Assembly

Figure 15A:
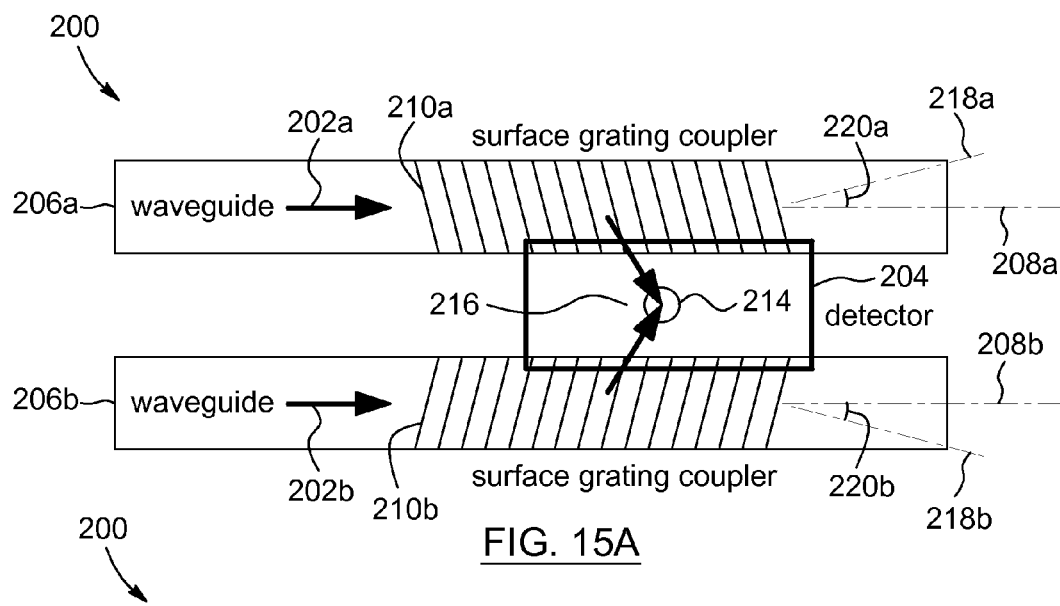
FIGS. 15A and 15B are schematic top and side views of a coupling assembly for coupling a pair of optical signals onto a same detector, in accordance with an embodiment, the coupling assembly including a pair of parallel and coplanar waveguides and a pair of corresponding coupling elements provided therein.
Figure 15B:
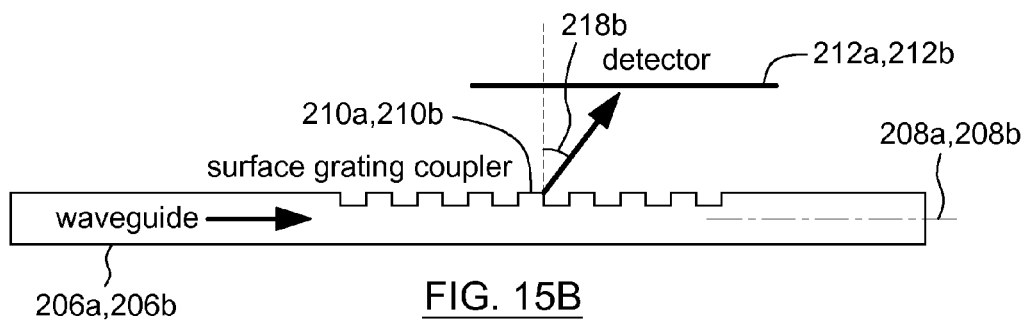

In accordance with another aspect of the invention, there is provided a waveguide coupling assembly 200 for coupling a pair of light signals 202a, 202b onto a same detector 204, an embodiment of which is shown in FIGS. 15A and 15B.

Embodiments of the waveguide coupler assembly according to this aspect of the invention have been described above in connection with the polarization-insensitive optical receiver 20 shown in FIGS. 4 to 11. However, it will be understood by one of ordinary skill in the art that the waveguide coupling assembly may be used in any configuration including two parallel and coplanar waveguides guiding respective optical signals where it is desirable to couple the two optical signals out of their respective waveguides and to direct them to a same region disposed out-of-plane relative to the waveguides. In particular, it could be of interest to position a photodetector in this same region for collecting simultaneously the light from two parallel and coplanar waveguides guiding respective optical signals. In that case, since the incidence angle on the detector is different for the two optical signals, interference fringes are created at the detector surface. These interference fringes are averaged out by the detection. The photocurrent produced by the detector is thus proportional to the sum of the intensities of the individual optical signal without any optical interference.

Referring to FIGS. 15A and 15B, the waveguide coupling assembly 200 first includes a pair of parallel and coplanar waveguides 206a, 206b. The two waveguides 206a, 206b generally to optical waveguides disposed on a same substrate and may be embodied by any appropriate planar waveguide based on silicon or other high-index-contrast-based integrated technologies including, but not limited to, a slab waveguide, a strip waveguide, a ridge waveguide and a rib waveguide. Each waveguide 206a, 206b guides a respective optical signal 202a, 202b along a respective waveguiding axis 208a, 208b and is out-of-plane relative to the detector 204.

It will be understood that it is an advantage of the waveguide coupling assembly according to embodiments of the invention that two optical signals propagating along respective parallel waveguides can be coupled out of their respective waveguides and be directed toward and be combined on a same region of a detector.

For this purpose, embodiments of the waveguide coupling assembly 200 such as in FIGS. 15A and 15B also include a pair of coupling elements 210a, 210b. Each coupling element 210a, 210b is provided in a corresponding one of the pair of waveguides 206a, 206b and is configured to couple the corresponding optical signal 202a, 202b out of the respective waveguide 206a, 206b and to direct the same toward the detector 204 at a respective angle 212a, 212b. This angle 212a, 212b is chosen so that the two corresponding optical signals 202a, 202b impinge on the detector 204 on a same region 214 thereof, where the two optical signals 202a, 202b are combined as a combined signal 216.

The coupling elements 210a, 210b may be embodied by surface grating couplers but other appropriate optical couplers could be used. In the illustrated embodiment, each surface grating coupler has a periodicity axis 216a, 216b that forms a non-zero angle 218a, 218b with the waveguiding axis 208a, 208b of the respective waveguide 206a, 206b. It will be understood, however, that in other embodiments and depending on factors such as the position of the detector 204 with respect to the two waveguides 206a, 206b, the non-zero angle 218a, 218b between the waveguiding and periodicity axes 208a, 208b and 216a, 216b, and thus the out-of-plane angle 212a, 212b to the plane of the waveguides 206a, 206b need not be the same for the two waveguides 206a, 206b.

Of course, numerous modifications could be made to the embodiments described above without departing from the scope of the present invention.

The invention claimed is:

1. A polarization-insensitive optical receiver for demodulating a phase-modulated input optical signal, the optical receiver comprising:
   a polarization splitter for splitting the input optical signal into a first and a second polarization component having substantially orthogonal polarization states and for launching the polarization components into a first and a second optical path, respectively;
   a first and a second interferometric module respectively disposed in the first and second optical paths to receive a respective one of the first and second polarization components, each interferometric module comprising a delay line receiving a portion of the respective polarization component and producing therefrom a time-shifted version of the respective polarization component, each interferometric module being configured to mix the respective polarization component with the time-shifted version thereof so as to provide a plurality of output signals, each output signal corresponding to a different relative phase shift between the respective polarization component and the time-shifted version thereof, the delay lines of the first and second interferometric modules being disposed within a same physical region of the optical receiver and defining spiraling structures intertwined with each other; and
   a plurality of detectors, each detector detecting one of a plurality of combined signals, each combined signal including an output signal from each of the first and second interferometric modules corresponding to a same relative phase shift.

2. The polarization-insensitive optical receiver according to claim 1, configured to perform a DPSK demodulation of the phase-modulated input optical signal.

3. The polarization-insensitive optical receiver according to claim 1, configured to perform a DQPSK demodulation of the phase-modulated input optical signal.

4. The polarization-insensitive optical receiver according to claim 1, wherein each interferometric module comprises a multimode interference coupler for mixing the respective polarization component with the time-shifted version thereof.

5. The polarization-insensitive optical receiver according to claim 1, wherein each delay line comprises:
   a pair of adjacent and substantially parallel winding segments, one of the winding segments receiving the portion of the respective polarization component and defining an inwardly-directed optical path for guiding the same inside the spiraling structure, and the other winding segment defining an outwardly-directed optical path for guiding the portion of the respective polarization component outside of the spiraling structure; and
   a transition segment serially connecting the pair of winding segments and defining a transitional optical path inside of the spiraling structure.

6. The polarization-insensitive optical receiver according to claim 5, wherein the delay lines of the first and second interferometric modules are shaped and arranged so as to have 180-degree rotation symmetry about a virtual rotation axis which is perpendicular to the physical region of the optical receiver.

7. The polarization-insensitive optical receiver according to claim 5, wherein each winding segment of each delay line comprises a plurality of straight sections serially-connected to one another by 90-degree bend sections, with adjacent straight sections extending at substantially right angle relative to each other.

8. The polarization-insensitive optical receiver according to claim 5, wherein the transition segments of the delay lines of the first and second interferometric modules are intertwined with each other.

9. The polarization-insensitive optical receiver according to claim 5, wherein each of the delay lines of the first and second interferometric modules has an average geometrical position which coincides substantially with each other and with a center of the physical region of the optical receiver.

10. The polarization-insensitive optical receiver according to claim 1, wherein each delay line defines an optical path difference that produces a time delay between the respective polarization component of the input optical signal and the time-shifted version thereof that corresponds to one bit of the input optical signal.

11. The polarization-insensitive optical receiver according to claim 1, wherein the delay lines of the first and second interferometric modules introduce substantially identical time delays between the respective polarization component of the input optical signal and the time-shifted version thereof.

12. The polarization-insensitive optical receiver according to claim 1, wherein each interferometric module comprises a tuning assembly for adjusting an optical path difference introduced by the respective delay line.

13. The polarization-insensitive optical receiver according to claim 1, further comprising a tuning assembly for simultaneously adjusting optical path differences introduced by the respective delay lines of the first and second interferometric modules.

14. The polarization-insensitive optical receiver according to claim 1, further comprising a plurality of coupling assemblies, each coupling assembly being configured to combine, as one of the combined signals and onto one of the plurality of detectors, one of the output signals from each of the first and second interferometric modules corresponding to the same relative phase shift, each coupling assembly comprising:
   a pair of parallel and coplanar waveguides, each waveguide guiding one of the output signals along a respective waveguiding axis, the pair of waveguides being out-of-plane relative to the corresponding detector; and a pair of coupling elements, each coupling element being provided in one of the pair of waveguides and configured to couple the corresponding output signal out of the respective waveguide and to direct the same toward the detector at a respective angle, each angle being chosen so that the corresponding output signals impinge on the detector on a same region thereof.

15. The polarization-insensitive optical receiver according to claim 14, wherein each coupling element is a surface grating coupler provided in the respective waveguide, the surface grating coupler having a periodicity axis forming a non-zero angle with the waveguiding axis of the respective waveguide.

16. The waveguide assembly according to claim 14, wherein each waveguide is one of a slab waveguide, a strip waveguide, a ridge waveguide and a rib waveguide.

17. A waveguide assembly, comprising:
a substrate; and
a pair of waveguides disposed within a same physical region of the substrate and defining spiraling structures intertwined with each other, each waveguide being configured to propagate a respective optical signal and comprising:
a pair of adjacent and substantially parallel winding segments, one of the winding segments receiving the respective optical signal and defining an inwardly-directed optical path for guiding the respective optical signal inside the spiraling structure, and the other winding segment defining an outwardly-directed optical path for guiding the respective optical signal outside of the spiraling structure; and
a transition segment serially connecting the pair of winding segments and defining a transitional optical path inside of the spiraling structure.

18. The waveguide assembly according to claim 17, wherein the pair of waveguides are shaped and arranged so as to have 180-degree rotation symmetry about a virtual rotation axis which is perpendicular to a plane of the substrate.

19. The waveguide assembly according to claim 17, wherein each winding segment of each waveguide comprises a plurality of straight sections serially-connected to one another by 90-degree bend sections, with adjacent straight sections extending at substantially right angle relative to each other.

20. The waveguide assembly according to claim 17, wherein the pair of waveguides have substantially a same length.

21. The waveguide assembly according to claim 17, wherein each waveguide is one of a slab waveguide, a strip waveguide, a ridge waveguide and a rib waveguide.

22. The waveguide assembly according to claim 17, wherein the transition segments of the pair of waveguides are intertwined with each other.

23. The waveguide assembly according to claim 17, wherein each of the pair of waveguides has an average geometrical position which coincides substantially with each other and with a center of the physical region of the substrate.

24. The waveguide assembly according to claim 17, wherein each transition segment of each waveguide comprises a 180-degree waveguide bend.

25. A waveguide coupling assembly for coupling a pair of optical signals onto a same detector, the waveguide coupling assembly comprising:
a pair of parallel and coplanar waveguides, each waveguide guiding one of the optical signals along a respective waveguiding axis, the pair of waveguides being out-of-plane relative to the detector; and
a pair of coupling elements, each coupling element being provided in one of the pair of waveguides and configured to couple the corresponding optical signal out of the respective waveguide and to direct the same toward the detector at a respective angle, each angle being chosen so that the pair of optical signals impinge the detector on a same region thereof.

26. The waveguide coupling assembly according to claim 25, wherein each coupling element is a surface grating coupler provided in the respective waveguide, the surface grating coupler having a periodicity axis forming a non-zero angle with the waveguiding axis of the respective waveguide.

27. The waveguide assembly according to claim 25, wherein each waveguide is one of a slab waveguide, a strip waveguide, a ridge waveguide and a rib waveguide.

* * * * *